US009599090B2

(12) United States Patent
Dale et al.

(10) Patent No.: US 9,599,090 B2
(45) Date of Patent: Mar. 21, 2017

(54) ROTOR APPARATUS

(75) Inventors: Jason Dale, Chester (GB); Aage Bjørn Andersen, Rælingen (NO)

(73) Assignee: SEA-LIX AS, Raelingen (NO)

( * ) Notice: Subject to any disclaimer, the term of this patent is extended or adjusted under 35 U.S.C. 154(b) by 800 days.

(21) Appl. No.: 13/980,726

(22) PCT Filed: Jan. 20, 2012

(86) PCT No.: PCT/GB2012/000056
§ 371 (c)(1),
(2), (4) Date: Sep. 24, 2013

(87) PCT Pub. No.: WO2012/098363
PCT Pub. Date: Jul. 26, 2012

(65) Prior Publication Data
US 2014/0017065 A1 Jan. 16, 2014

(30) Foreign Application Priority Data

Jan. 20, 2011 (GB) .................................. 1101010.5

(51) Int. Cl.
*F03B 13/26* (2006.01)
*F03B 3/04* (2006.01)
(Continued)

(52) U.S. Cl.
CPC ............ *F03B 13/264* (2013.01); *B23P 15/02* (2013.01); *F01D 1/26* (2013.01); *F03B 3/04* (2013.01);
(Continued)

(58) Field of Classification Search
CPC .... F03B 3/04; F03B 3/12; F03B 3/126; F03B 13/105; F03B 13/264; F05B 2210/404; F05B 2220/32
See application file for complete search history.

(56) References Cited

U.S. PATENT DOCUMENTS 587,814 A 8/1897 Harford
622,474 A * 4/1899 Hoskin .................... F04D 3/02
290/52
(Continued)

FOREIGN PATENT DOCUMENTS

CN 2640574 Y 9/2004
CN 101474770 A 7/2009
(Continued)

OTHER PUBLICATIONS

International Search Report and Written Opinion mailed Oct. 8, 2013 (PCT/EP2013/057136); ISA/EP.
(Continued)

*Primary Examiner* — Craig Kim
*Assistant Examiner* — Jason Davis
(74) *Attorney, Agent, or Firm* — Banner & Witcoff, Ltd.

(57) ABSTRACT

A rotor apparatus for extracting energy from bidirectional fluid flows comprises a first rotor (7) mounted for rotation about an axis of rotation (4) in a first direction of rotation, the first rotor (7) having at least one helical blade (2) with a pitch that decreases in a direction along the axis of rotation (4); and a second rotor (8) mounted for rotation about the same axis of rotation (4) in an opposite direction of rotation and having at least one helical blade (2) with a pitch that increases in the same direction along the axis of rotation (4), wherein fluid exiting the first rotor (7) is passed to the second rotor (8).

23 Claims, 16 Drawing Sheets

(51) Int. Cl.
*F03B 3/12* (2006.01)
*F01D 1/26* (2006.01)
*B23P 15/02* (2006.01)
*F03B 13/10* (2006.01)

(52) U.S. Cl.
CPC ............... *F03B 3/12* (2013.01); *F03B 3/126* (2013.01); *F03B 13/105* (2013.01); *F05B 2210/404* (2013.01); *F05B 2240/133* (2013.01); *F05B 2240/243* (2013.01); *F05B 2240/40* (2013.01); *F05B 2250/15* (2013.01); *F05B 2250/232* (2013.01); *F05B 2250/25* (2013.01); *Y02E 10/223* (2013.01); *Y02E 10/28* (2013.01); *Y10T 29/49325* (2015.01)

(56) References Cited

U.S. PATENT DOCUMENTS

| | | | |
|---|---|---|---|
| 4,526,321 | A | 7/1985 | Knudsen |
| 4,722,665 | A | 2/1988 | Tyson |
| 5,760,515 | A | 6/1998 | Burns |
| 5,997,242 | A | 12/1999 | Hecker et al. |
| 6,357,997 | B1 * | 3/2002 | Rosefsky ................ B63H 1/12 415/131 |
| 8,870,540 | B2 * | 10/2014 | Houlsby ................ F03B 3/121 416/187 |
| 2007/0199885 | A1 | 8/2007 | Shmuel et al. |
| 2007/0284884 | A1 * | 12/2007 | Stothers .................... F03B 3/04 290/54 |
| 2009/0022597 | A1 | 1/2009 | Bowie |
| 2010/0320771 | A1 * | 12/2010 | Urch ..................... F03B 17/061 290/55 |

FOREIGN PATENT DOCUMENTS

| | | |
|---|---|---|
| CN | 201357010 Y | 12/2009 |
| CN | 201461213 U | 5/2010 |
| DE | 19828171 A1 | 12/1999 |
| EP | 0650753 A2 | 5/1995 |
| EP | 2519739 A2 | 11/2012 |
| GB | 1491113 A | 11/1977 |
| JP | H09224885 A | 9/1997 |
| WO | 2006008729 A1 | 1/2006 |
| WO | 2011058556 A2 | 5/2011 |

OTHER PUBLICATIONS

UKIPO Search Report dated Aug. 6, 2012.
Jul. 29, 2015—(CN)—Office Action—App 201380029638 Eng Tran.
International Search Report mailed Jul. 18, 2012 (PCT/GB2012/000056); ISA/EP.
Oct. 6, 2016—(GB) Examination Report—App GB1101009.7.
Oct. 6, 2016—(GB) Examination Report—App GB1101010.5.

* cited by examiner

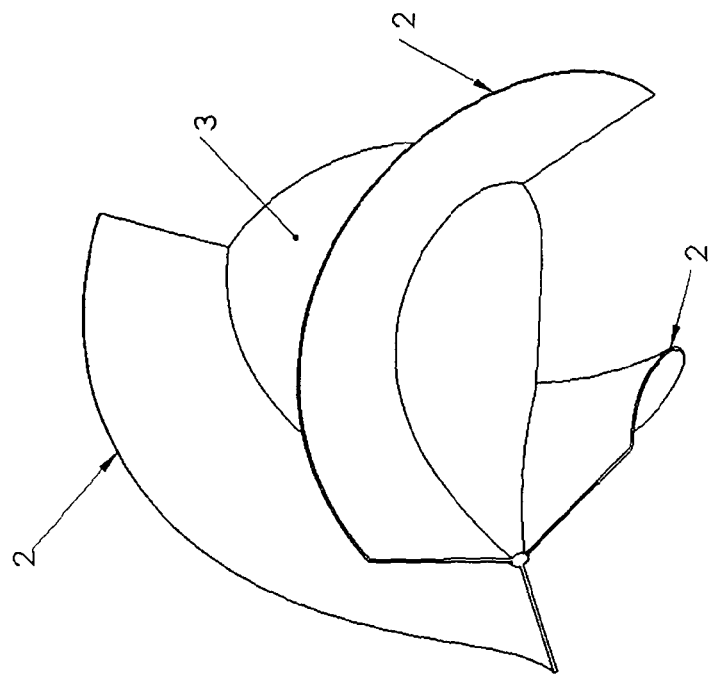
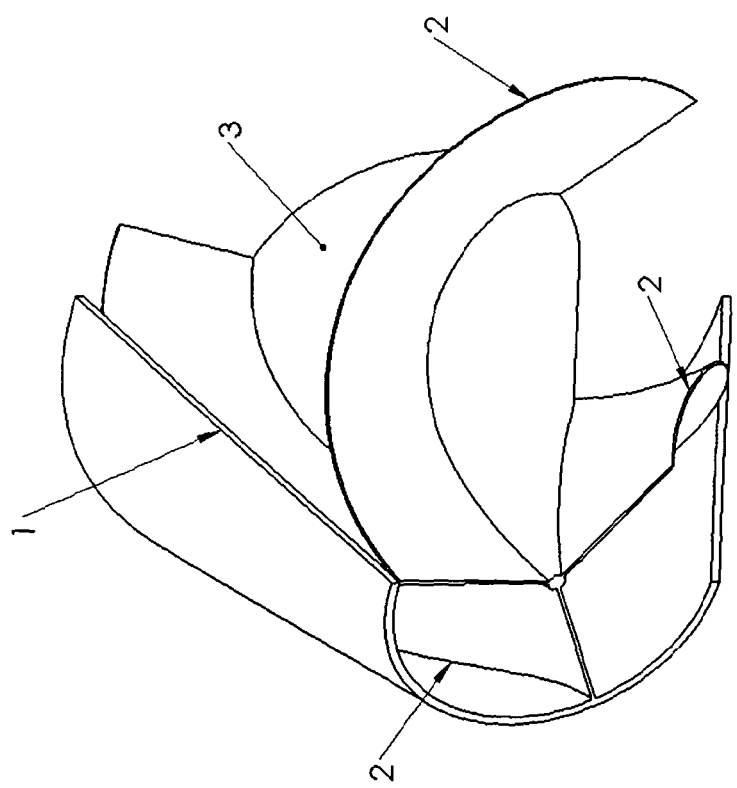
Fig. 3A
Fig. 3B

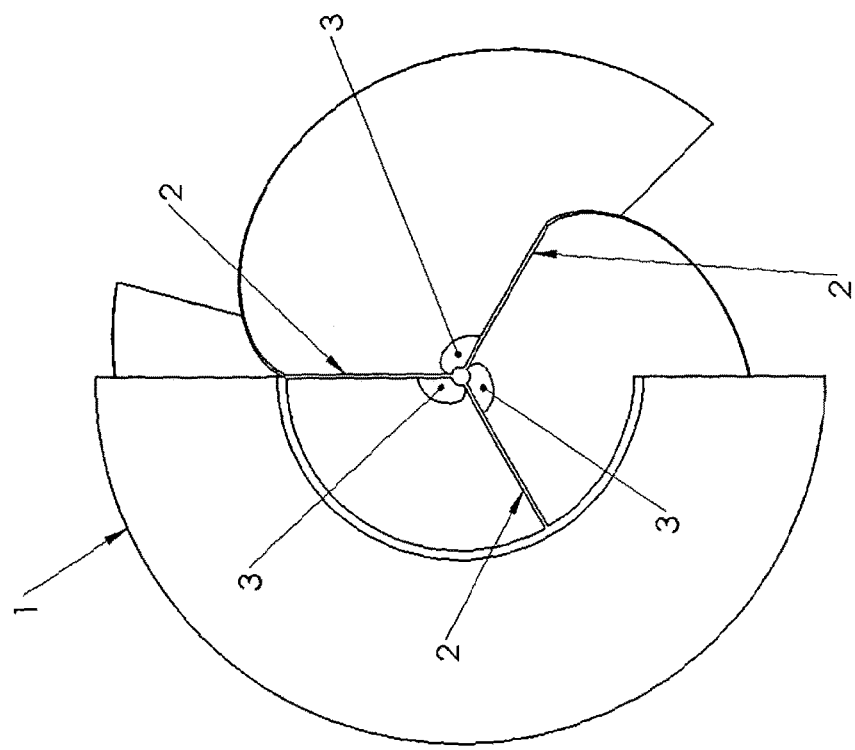
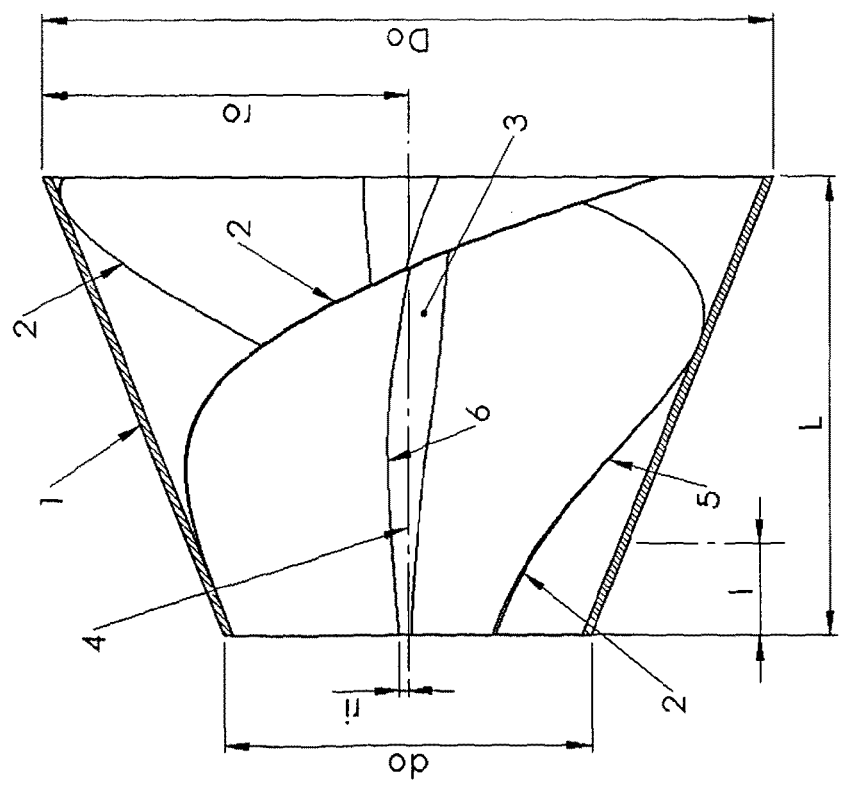
Fig. 4A
Fig. 4B

ROTOR APPARATUS

CROSS-REFERENCE TO RELATED APPLICATIONS

The present application is a U.S. National Phase filing of International Application No. PCT/GB2012/000056, filed on Jan. 20, 2012, designating the United States of America and claiming priority to British Patent Application No. 1101010.5 filed Jan. 20, 2011. This application claims to and the benefit of the above-identified applications, which are incorporated by reference herein in their entireties.

BACKGROUND

The invention relates to a rotor for extracting energy from a flowing liquid, for example a tidal flow.

A flowing fluid possesses kinetic energy due to its motion. Naturally occurring fluid flows can be found in tidal currents, coastal or oceanic currents, river flows, thermal currents, air currents and elsewhere. Fluid flows can also be generated by man directly or indirectly. For instance, secondary fluid flows may be generated upstream or downstream of an obstacle placed in a naturally occurring fluid flow such as a dam in a river. Fluid flows may be generated by the transport of a fluid in a pipeline or by a machine such as fluid flows in a fluid system installed on a train, on a ship or on an automobile.

Energy conversion from gas flows such as air currents, i.e. wind-power, is a well developed technology. Numerous specially designed turbines have been made for extracting energy from the wind. However, the potential energy level is much larger in a liquid flow than in a gas flow because the fluid density is generally higher. For example, in tidal currents, fluid speeds in excess of 5 m/s may be generated, although a more typical speed may lie in the range of 1.5-2.5 m/s. Given that the density of seawater is around 1000 $kg/m^3$, the energy density of tidal currents can typically be of the order of 4000 $W/m^2$. In comparison, the density of air is around 1.2 $kg/m^3$, therefore the energy density of wind at this speed is typically around 5 $W/m^2$, this being around 800 times less than that available in a corresponding tidal current.

A need therefore exists for an improved device for extraction of energy from liquid flows such as tidal flows.

SUMMARY

Viewed from a first aspect, the systems and methods described herein provides a rotor apparatus for extracting energy from bidirectional fluid flows, the rotor apparatus comprising a first rotor mounted for rotation about an axis of rotation in a first direction of rotation, the first rotor having at least one helical blade with a pitch that decreases in a direction along the axis of rotation; and a second rotor mounted for rotation about the same axis of rotation in an opposite direction of rotation and having at least one helical blade with a pitch that increases in the same direction along the axis of rotation, wherein fluid exiting the first rotor is passed to the second rotor.

Since the helical pitch of the helical blade is decreased in one direction each rotor possesses design flow direction, which is from the larger pitch end to the smaller pitch end. Fluid entering parallel to the longitudinal axis and head-on to the larger helical pitch end would meet less of a resistance and would be gently guided into the rotor. As the fluid passes along the helical blade the decreasing pitch may, in one embodiment, allow for efficient extraction of energy from the flow. Fluid could still flow parallel to the longitudinal axis and head-on in a non design direction but power extraction may be greater for the design direction since, for the non-design direction, energy would be lost in initially aligning the oncoming fluid flow to the angled rotor blades. Thus, conventionally rotors are designed with a design flow direction. In situations where the flow direction reverses prior art arrangements might be provided with means to re-align with the new flow direction, such as a turret mounting or a tethered float in a flow or a change in blade angle by some means.

In one implementation, the rotor apparatus is a generator rotor, and hence one embodiment comprises a generator including the rotor apparatus, for example a generator for generating electricity from tidal flows.

The above two-stage bidirectional rotor arises from the non-obvious realisation that when fluid exits a unidirectional helical bladed rotor the fluid will possess both a longitudinal and radial component and that this radial component will be well suited for entering the smaller helical pitch end of another unidirectional helical bladed rotor, when the two rotors have blades that turn in the same direction as the pitch decreases (i.e. both rotors having clockwise blades as the pitch decreases or both rotors having anticlockwise blades as the pitch decreases). Thus, in the second rotor the fluid flow direction may enter from the smaller helical pitch end and flow towards the larger helical pitch end. The resulting power extraction would be the same as the initial case but in reverse and the fluid would exit the rotor with only a longitudinal component. Since the two rotors are contra-rotating and oppose one another, fluid can flow in the opposite direction with the same result. Hence, the two-stage rotor of this aspect allows for energy to be extracted from flows in either direction along an axis without compromising the level of power production. One embodiment is a rotor apparatus for extracting energy from tidal flows, wherein energy may be extracted by production of electricity, whereby the rotor apparatus functions as a tidal turbine. The invention may hence take the form of a tidal turbine comprising the rotor apparatus. A suitable bidirectional liquid flow might also be generated due to the regular back and forth or up and down movement of a ship or automobile.

In one embodiment the first and/or second rotor(s) have an opening at the inlet or outlet end of the rotor apparatus that is arranged for axial flow of fluid. Thus, the opening is perpendicular to the axis of rotation of the rotor apparatus and the blades may be formed to receive or expel fluid flowing in a generally axial direction, optionally in a solely axial direction. The larger helical pitch at the inlet and outlet end hence receives mainly or solely axial flow, which increases efficiency.

In one implementation, the first and second rotors have openings at their opposed ends that are not arranged for solely axial flow, but instead may be adapted to receive or expel fluid flowing with a radial component to its movement. The radial flow component is useful since the two opposed ends have a small pitch to the rotor blade and therefore transfer of flow between the two rotors is most effective when the flow has a radial component as well as an axial component.

One embodiment does not permit flow of fluid through either opening of the rotor when the fluid flow has only a radial component and no axial component.

In one embodiment, the first and second rotors have opposed ends that are of the same diameter. The first rotor and/or second rotor may be a cylindrical rotor having a blade formed by a cylindrical helix. However, in other embodiments the first rotor and/or second rotor have a blade or blades formed by a surface extending between inner and outer conic helixes, the conic helixes each having a pitch that decreases as the radius of the helix increases. The rotors may have features as discussed below in relation to the fourth aspect of the invention, for example in relation to the shape and form of the conic helixes, the number of blades, the outer rim and inner peripheral surface, generator features and so on. In the embodiment where both the first rotor and the second rotor comprise a blade or blades formed between conic helixes, the two rotors have large diameter ends opposing one another and being of the same diameter.

The first and second rotors have ends opposing one another such that fluid flows from one rotor to the other. In one implementation, the opposing ends are directly opposing, i.e. with a gap in between the two rotors, which, in one implementation, may be a minimal gap. This makes best used of the radial component of the flow exiting one rotor and entering the other. However, in tidal turbine applications, to reduce the danger to aquatic life, the gap in between the two rotors may be increased to reduce the chopping effect between rotors. Then aquatic life may pass through the device unharmed by being carried along by the swirling flow.

In one implementation, the first rotor and the second rotor have a blade or blades of the same shape formed by similar conic helixes. This may allow for bidirectionality since substantially similar fluid flow can enter the two-stage rotor apparatus from either end with the same resulting power take off.

The rotor apparatus may comprise a housing about the first and second rotors. The housing may supports the rotors for rotation about the axis of rotation. The rotor housing may be designed to perform various functions. For instance, the rotor housing may be designed purely to house the rotors and provide support by way of mechanical bearings, magnetic bearings or some other type of active or passive bearing system which allows the rotors to freely rotate with low friction. A sealing arrangement such as lip seals, labyrinth seals or some other type of sealing arrangement may also be in place to prevent the liquid flow from reaching the bearings or electrical components in the rotor housing. Or, some of the liquid flow may be directed towards the bearings and heat exchangers of electrical components and used as coolant in demanding applications.

The housing may also enclose generator parts, control systems and suchlike. Any suitable shape of housing may be used. In one embodiment, the rotor housing has an inlet section and an outlet section. The rotor housing may be used to enhance the performance of the rotors. The inlet geometry of the rotor housing may be designed to increase the linear velocity of the liquid flow as it enters the rotor entrance through use of a convergent section or some other geometry. Since the power available from the liquid flow is proportional to the cube of the liquid flow velocity, this provides an effective means of increasing the amount of available energy. The outlet of the rotor housing may also be designed to slow down the liquid flow in a controlled manner through the use of a divergent section or specially designed outlet geometry so that viscous and turbulence losses are minimised and the fluid is gently returned to the main bulk of fluid flow with minimal disturbance.

Viewed from a second aspect, the invention provides a method comprising use of a two-stage rotor apparatus as described above for the production of rotational kinetic energy from flow of a fluid. In one implementation, the method comprises use of the two-stage rotor apparatus to produce energy from a tidal flow, and in one implementation, using the rotor to produce electrical energy from the tidal flow.

Viewed from a third aspect, the invention provides a method of manufacturing a two-stage rotor apparatus comprising: mounting a first rotor for rotation about an axis of rotation, the first rotor having at least one helical blade with a pitch that decreases in a direction along the axis of rotation; and mounting a second rotor for rotation about the same axis of rotation in an opposite direction of rotation, the second rotor having at least one helical blade with a pitch that increases in the same direction along the axis of rotation.

The method may include providing features of the rotor apparatus as discussed above in relation to the first aspect. The shape and form of the rotor may be selected as discussed below in relation to the method of the sixth aspect.

Viewed from a fourth aspect the invention provides a rotor comprising at least one blade arranged to rotate about an axis of rotation, the blade being formed by a surface extending between inner and outer conic helixes, the conic helixes each having a pitch that decreases as the radius of the helix increases.

In the present context, a conic helix is a three dimensional curve formed on a surface of a generally conical body. The surface of the generally conical body may be conical, frustoconical or any other shape formed as a surface of revolution that has a generally increasing or decreasing radius. Thus the surface is not specifically limited to a straight sided cone but could instead be a convex sided cone or frustocone such as a zone or ogive nose cone shape, or alternatively the cone could be a concave sided cone or frustocone. What is important for the rotor of the invention is that each conic helix is formed with a radius that increases along an axis of the rotor and a pitch that decreases as the radius increases. The inner and outer conic helixes may have the same decrease in pitch, although applications are possible where a different decrease in pitch for the inner and outer conic helix may be used.

The terms "inner" and "outer" are used herein to refer to portions of the rotor that are at a smaller or greater radius from the axis of rotation of the rotor.

The rotor is for extracting kinetic energy from a liquid fluid flow or system of liquid fluid flows by converting the kinetic energy in the liquid fluid flow into a rotational force or torque, hence permitting onward conversion into a more convenient form of energy, such as electrical energy. In one implementation, the rotor is for generation of electricity from tidal flows.

There may be an outer rim located about the outer edge of the blade and corresponding to the surface upon which the outer conic helix is formed. There may be an inner peripheral surface located about the inner edge of the blade and corresponding to the surface upon which the inner conic helix is formed. The rotor hence may includes inner and outer surfaces enclosing the blades, which may be the inner and outer generally conical surfaces of revolution corresponding to the paths of the conic helixes. Internally, the rotor hence has one or more flow passages formed between front and back blade surfaces, the outer rim and the inner surface. The flow passages effectively contain the flowing fluid and prevent energy being lost due to tip losses.

To allow for rotation of the blade, the blade may be mounted on the outer rim and/or the inner peripheral surface, which would then be mounted for rotational movement, e.g. by means of bearings and a fixed shaft. In one embodiments the blade extends between and is mounted to both the outer rim and inner surface. This ensures an enclosed flow of fluid and minimises tip losses. Alternatively, it would be possible for the blade to be mounted to just one of the outer rim and inner surface, with the other of the outer rim or the inner surface remaining fixed. This latter arrangement may give rise to greater losses but it could simplify manufacture of the rotor.

In one embodiment the rotor has an opening at the small diameter end of the rotor that is arranged for axial flow of fluid. Thus, the opening is perpendicular to the axis of rotation of the rotor and the blades may be formed to receive or expel fluid flowing in a generally axial direction. In one embodiment, the rotor has an opening at the large diameter end that is also perpendicular to the axis of rotation of the rotor. However, in this embodiment the blades at the large diameter end are not arranged for solely axial flow, but instead may be adapted to receive or expel fluid flowing with a radial component to its movement. In another embodiment, fluid flow is not permitted through either opening of the rotor when the fluid flow has only a radial component and no axial component.

The inner and outer conic helix may start at the same longitudinal position along the axis of rotation of the rotor before extending along the direction of the axis of rotation of the rotor. In one implementation, the inner and outer conic helix also extend for about the same axial length along the direction of the axis of rotation of the rotor. With this arrangement when an outer rim of the rotor is present it naturally encloses an opening that has an axial component of the flow for fluid to flow through the opening.

The conic helix can be any suitable shape that allows for a three dimensional curve with an increasing radius and decreasing pitch as described above. One option is the use of an Archimedean spiral with a linear increase in radius, can be used to produce a rotor with a simple shape based on a straight sided frustocone. However, the conic helix could alternatively be based on Euler, Fibonacci, Hyperbolic, Lituus, Logarithmic, Theodorus or any other known spiral having varying radius r as a function of the polar coordinate θ but also having a third variable, the length l, varying also as function of the polar coordinate θ. Some curves and/or the use of non-linear radius increases will result in conic helixes based on conical shapes with convex or concave sides, as discussed above.

The inner and outer conic helix may be based on the same form of spiral or curve, with different initial and final radii. Alternatively, different forms of curve or spiral could be used for the inner and outer conic helix to produce a more complex shape for the blade.

Whilst a single blade could be used it is advantageous to use multiple blades. This creates multiple flow passages and also allows the rotor to be easily balanced. The choice of two, three or more rotor blades may depend on a balance of rotor strength, ease of manufacture and energy lost to friction. In the present embodiment, three rotor blades offers a strong and balanced three point construction with minimal friction loss.

The blade or blades may be formed as surfaces generated by straight lines between points on the inner and outer conic helixes at the same longitudinal distance along the direction of the axis of rotation of the rotor. Thus, the blade surface may connect the pair of conic helixes in the radial direction. Alternatively, the blades may be formed as surfaces generated by curves between points on the inner and outer conic helixes at the same longitudinal distance along the direction of the axis of rotation of the rotor. With this arrangement the blades surfaces may, for example, be concave when viewed from the large diameter end of the rotor.

The inner and outer conic helixes may both increase in radius at the same rate, such that the conic surfaces are generally parallel. However, it can be advantageous to adjust the performance of the rotor by having a different rate of increase in diameter for the inner and outer conic helixes. The inner conic helix may increase in radius at a slower rate than the increase in radius of the outer conic helix in order to reduce or restrict the hydrodynamic reaction forces and torsional forces produced by the rotor. Alternatively, the inner conic helix radius may increase at a faster rate than the outer conic helix radius in order to increase hydrodynamic reaction forces and torsional forces.

The parameters discussed above, including the radius of the conic helix, pitch of the conic helixes and the relative increase in radius of the inner and outer conic helixes may be varied linearly along the length of the rotor. However, non-linear variations of radius, pitch and relative radius would also be possible.

In one embodiment the rotor includes a housing located about the outer rim. The housing may enclose the rotor and support bearings or shafts enabling rotation of the rotor. The housing may include a convergent inlet and/or divergent outlet to condition the flow of fluid before it enters the rotor.

The rotor may be provided with one or more generators for converting the rotational movement of the rotor into electrical energy. The outer rotating rim of the rotor may be arranged to act as the rotor in the electrical generator with a part of a stationary housing being the stator. Alternatively, the inner peripheral surface may be arranged to act as the rotor with stationary parts along the axis of rotation of the rotor providing the stator. With these arrangements the rotor and stator form an electrical generator set that is driven by the liquid flow and directly converts the motion of the rotor into electrical energy without the need to transfer the rotational force to an additional device. Permanent or electromagnets may be mounted on the outer rim of the rotor and on the inner of the rotor housing for this purpose. The stator and the rotor formed may be configured in any suitable manner to produce alternating current (AC) or direct current (DC) in an efficient way. Electronics and signal conditioning may be incorporated in the rotor housing or elsewhere to facilitate connection to an electrical network or a storage facility such as a battery installation.

However, the use of magnets is not considered ideal for low speed applications. In low flow speed applications it is more efficient to have a large diameter rotor that is able to capture high levels of torque from the low speed fluid flow. This results in a relatively low speed of rotation of the rotor. A large number of magnets would be needed to directly generate the correct frequency for direct connection to a typical electrical grid. If a smaller number of magnets were used then additional electronic equipment may be used to condition the electrical signal to match the electrical grid.

Therefore, multiple low torque, high speed, high efficiency generators such as asynchronous generators, which are useful in variable speed, constant frequency applications, may be used. The high torque levels and slow speed of rotation are advantageous for this type of generator. The asynchronous generators can generate power that can then be fed directly to the grid at the correct frequency.

Since the rotor in this case may be a rotor with rotating peripheral inner and outer rims, large surface areas are available for connection to multiple high-speed, low torque generators. In some embodiments these generators, rather than a single generator connected to a central rotating shaft, may be used. Several generators may be placed around the periphery of the rotating outer rim in order to extract power, which, in one implementation, may be a maximum possible amount of power, and/or be placed in the internal central space of the rotor and extract power from the rotating inner peripheral surface. The connection between generator and either rim can be made with simple gearing or using a runner wheel.

Since the outer rim and inner peripheral surface in some embodiments may have a diameter that varies along the length of the rotor, then the multiple generators may be arranged to be connected to the outer rim or inner peripheral surface at different diameters to thereby run at different rotational speeds relative to the speed of rotation of the rotor.

In one embodiment the outer rim and/or inner peripheral surface have a generally conical surface, and multiple generators may be moveably mounted parallel to a conical surface in order to permit variation of the input rotational speed to the generators by movement along the cone surface. This arrangement operates in a similar fashion to some continuously variable transmission devices. The generators may be moved along the surface by appropriate frame and stepper motors. The generators may be mounted, for example, on the internal surface of the inner cone of the rotor, or on the external surface of the outer rim of the rotor.

In an alternative arrangement multiple generators may be mounted to a stepped surface of the inner peripheral surface or outer rim, i.e. a surface comprised of multiple stacked cylinders of different diameters. With this arrangement there may be multiple rings of generators mounted to a stepped surface at different diameters. One or more rings of generators may be engaged or disengaged at different speeds of rotation in order to generate electricity efficiently for the different speeds.

By enabling variable speed connection to the rotor in this way, a relatively constant generator speed within the variable range of the generators can be achieved through a range of fluid flows.

In another embodiment, a first rotor as described above is provided in combination with a second rotor as described above, with the large diameter ends of the first and second rotors opposing one another, such that fluid exits the large diameter end of one rotor and then enters the large diameter end of the other rotor. With this arrangement the rotors are both mounted for rotation about a single axis and may be arranged and mounted for contra-rotation, i.e. such that the first rotor rotates in the opposite direction about the axis to the second rotor. In this case the rotors may have blades that are formed from conic helixes that rotate in the same sense as the radius increases, i.e. both of the first and second rotors have blades that are formed clockwise as the conic helix radius increase, or alternatively both rotors have anti-clockwise blades. Further possible features of a two-stage rotor arrangement are discussed below.

Viewed from a fifth aspect, the invention provides a method comprising use of a rotor as described above for the production of rotational kinetic energy from flow of a fluid. In one implementation, the method comprises use of the rotor to produce energy from a tidal flow, and may use of the rotor to produce electrical energy from the tidal flow, for example in a generator.

Viewed from a sixth aspect, the invention provides a method of manufacturing a rotor comprising at least one blade arranged to rotate about an axis of rotation, the method comprising: defining an inner conic helix and an outer conic helix, the conic helixes each having a pitch that decreases as the radius of the helix increases; and forming the blade(s) as a surface extending between inner and outer conic helixes.

The method may include providing features of the rotor and conic helixes as discussed above, including one or more of an outer rim, inner peripheral surface, shaft, starting position and length of conic helix, shape of conic helix, change of radius of conic helix, relative change of radius of inner and outer conic helixes, change of pitch of conic helix, number of blades, housing, generators, second rotor and so on.

In some embodiments, the method comprises selecting the features of the rotor based on the desired characteristics of the rotor performance. For example, the method may comprise selecting the rate of change of radius of one conic helix or both conic helixes based on a desired torsional force output for a predetermined flow condition. The predetermined flow condition might for example be the average tidal flow at an intended installation site, and the desired torsional force may be matched with optimal input torque for the intended output device, which might be a generator or multiple generators. Similarly, the method may comprise selecting the relative change of radius of inner and outer conic helix or selecting the change in pitch of one conic helix or both conic helixes based on a desired torsional force output for a predetermined flow condition.

The use of multiple low torque, high speed, high efficiency generators mounted on rotor with a surface having a diameter that varies along the length of the rotor, wherein the multiple generators are arranged to be connected to the surface at different diameters to thereby run at different rotational speeds relative to the speed of rotation of the rotor is considered to be new and inventive in its own right, and therefore, viewed from a further aspect, the invention provides a rotor for generation of electrical power from a fluid flow, the rotor comprising a surface having a diameter that varies along the length of the rotor, wherein multiple generators are mounted to receive rotational force from movement of the surface at varying diameters thereof. The surface may be a generally conical surface or a stepped surface, as described above. The term generally conical is intended to refer to not only perfect right cones but also truncated cones, convex cones and concave cones as discussed above. The generators may be low torque, high speed, high efficiency generators such as asynchronous generators as discussed above. Several generators may be placed around the periphery of a rotating outer rim in order to extract power, which in one implementation, may be a maximum amount of power and/or be placed in an internal central space of the rotor and extract power from the rotating inner rim. The connection between generator and either rim can be made with simple gearing or using a runner wheel or some other means. The rotor may have features as discussed above in relation to the rotor and two-stage rotor apparatus. In one embodiment the generators may be moveably mounted parallel to the generally conical surface in order to permit variation of the input rotational speed to the generators by movement along the cone surface as discussed above.

The invention also encompasses use of the rotor described above for the production of electricity from fluid flows.

BRIEF DESCRIPTION OF THE DRAWINGS

Certain embodiments of the invention will now be described by way of example only and with reference to the accompanying drawings in which:

FIGS. 3A and 3B are perspective views of the rotor of FIGS. 1 and 2 with the outer rim partially and fully omitted, FIGS. 4A and 4B show an alternative embodiment of a rotor where the inner conic helix radius increases at a lesser rate than the outer conic helix radius.

DETAILED DESCRIPTION

Figure 1B:
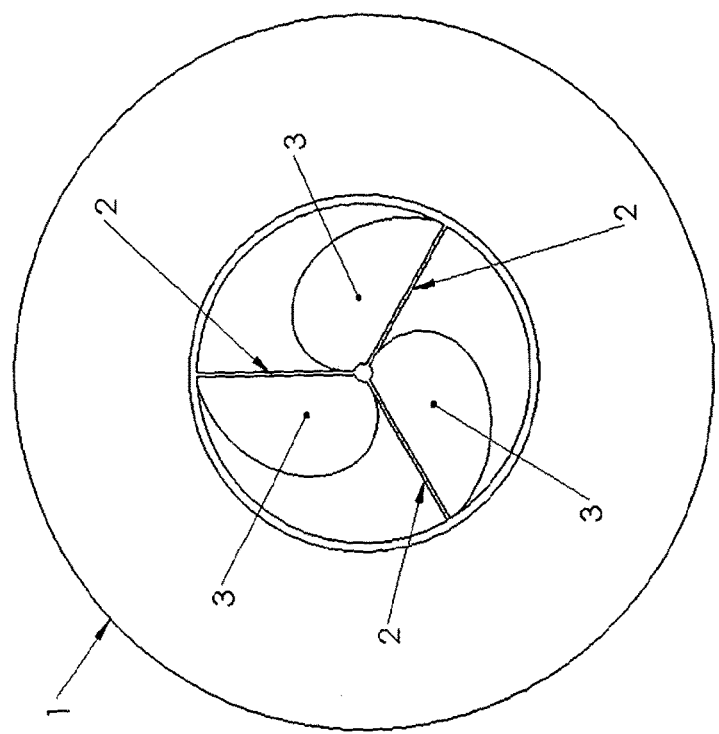
FIGS. 1A and 1B show an embodiment of a rotor in side view and end view.
Figure 1A:
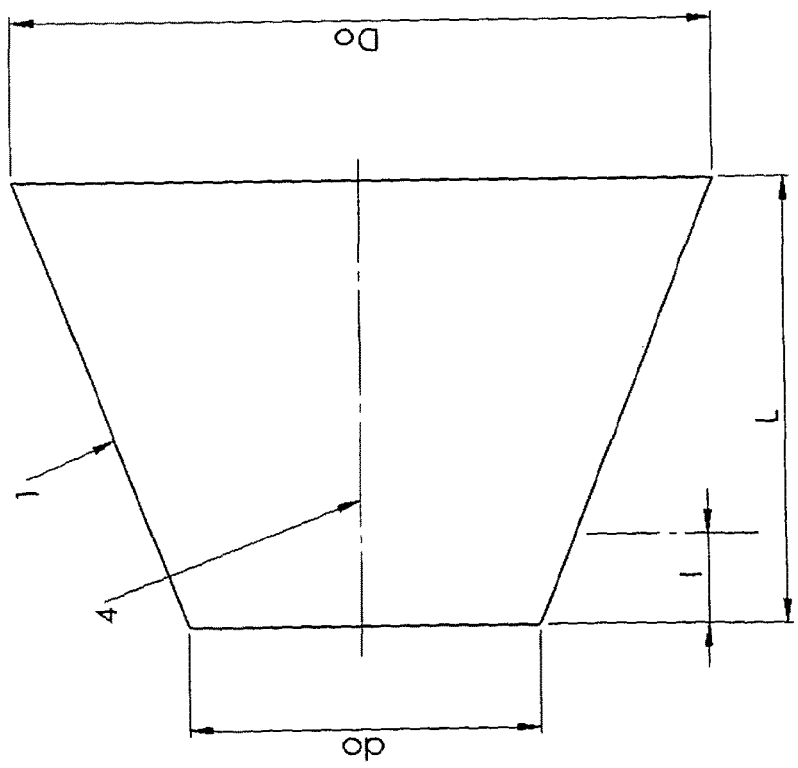

FIGS. 1A and 1B depict an embodiment of a rotor including an outer peripheral rim 1, blades 2 and inner peripheral surface 3. The rotor can be used to turn the flow of a liquid into rotational movement that can then be used to generate electricity. For example, in one embodiment the rotor is used in a turbine for generating electricity from tidal flows. The blades 2 extend between the inner peripheral surface 3 and the outer rim 1 and hence form enclosed flow paths. In this embodiment the underlying spiral that forms the shape of the blades 2 is based upon an Archimedean spiral where there is a linear increase in radius r with the polar coordinate θ. The resulting rotor therefore has the shape of a frustum of a cone. As noted below, other types of curve can be used. Three rotor blades 2 can be seen within the rotor and also the inner peripheral surface 3. The longitudinal axis of the rotor 4 is shown by a centre line. Throughout the figures, the maximum outer diameter of the rotor is denoted by Do and the minimum outer diameter by do. The length of the rotor is denoted by L and the local length l is measured from the end of the rotor having the minimum outer diameter do.

Figure 2B:
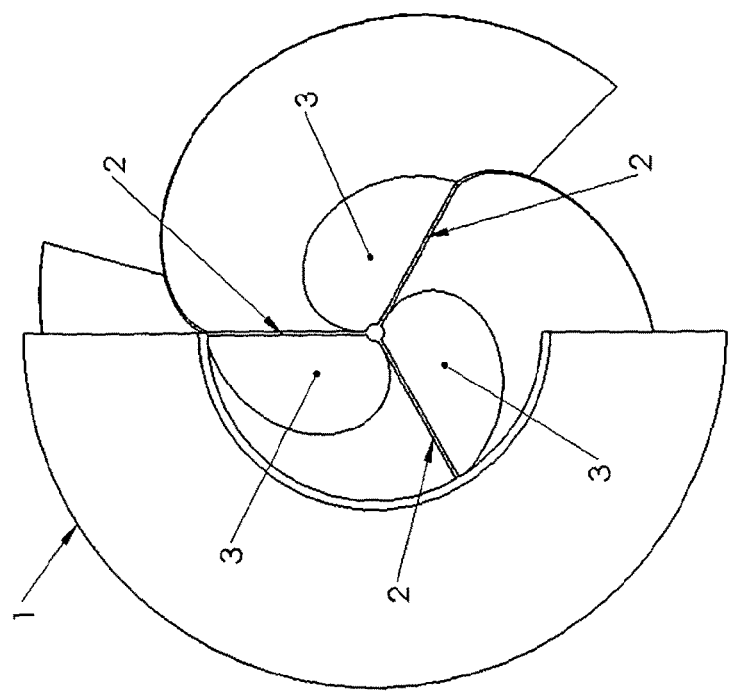
FIGS. 2A and 2B show the rotor of FIG. 1 with the outer peripheral rim partially cut-away so that more detail of the rotor design is visible.
Figure 2A:
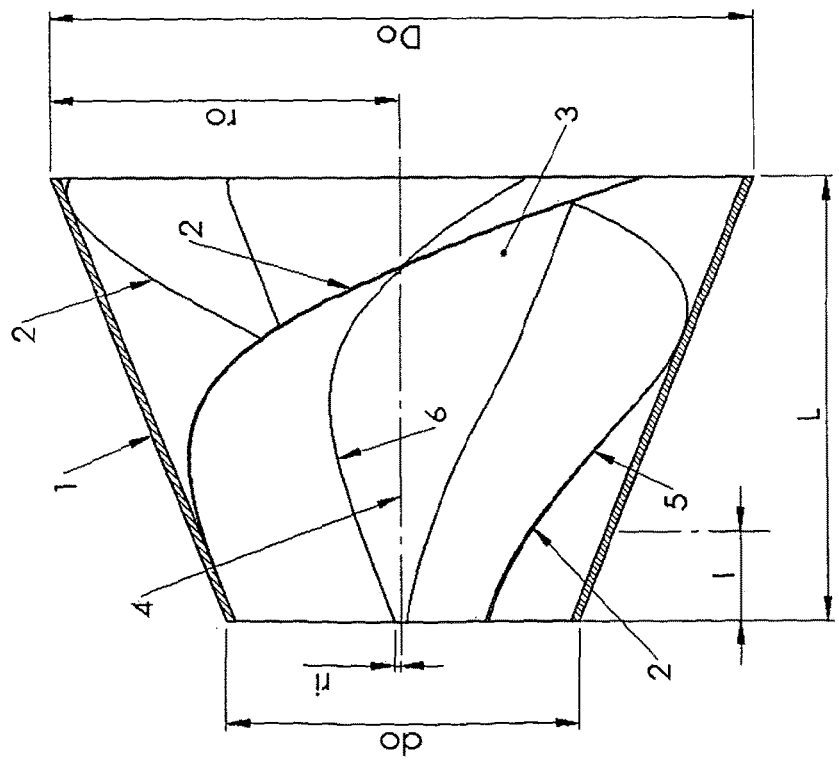

FIGS. 2A and 2B depict the rotor of FIGS. 1A and 1B with outer peripheral rim 1 partially hidden for clarity. The inner peripheral rim 3 is also highlighted. The three rotor blades 2 have a shape formed by a pair of conic helixes. Outer conic helix 5 is a helix formed on the internal surface of the outer rim 1 and forms a varying outer radius ro of the blade 2. Inner conic helix 6 is a helix formed on the outside of the inner cone 3 and forms a varying inner radius ri of the blade. Both of the helixes have an increasing radius and a decreasing helical pitch along the longitudinal axis 4. The blades 2 have a decreasing helical pitch resulting from an increasing helical frequency. The pair of conic helixes 5 and 6 are generated in a clockwise direction and have different initial radii which increase at an equal rate to form a pair of parallel conic helixes.

FIGS. 3A and 3B show perspective views of the rotor of FIGS. 1 and 2 in which further detail of the shape of the blades 2 can be seen.

FIGS. 4A and 4B show a variation of the rotor. In this embodiment the pair of conic helixes 5 and 6 are generated in a clockwise direction and form the shape of the blades 2 in the manner discussed above. However, the radius ri of the inner conic helix 6 increases at a lesser rate than the radius ro of the outer conic helix 5 to thereby form a pair of non-parallel conic helixes that are spaced further apart at the large diameter end of the rotor than at the small diameter end of the rotor.

Figure 5B:
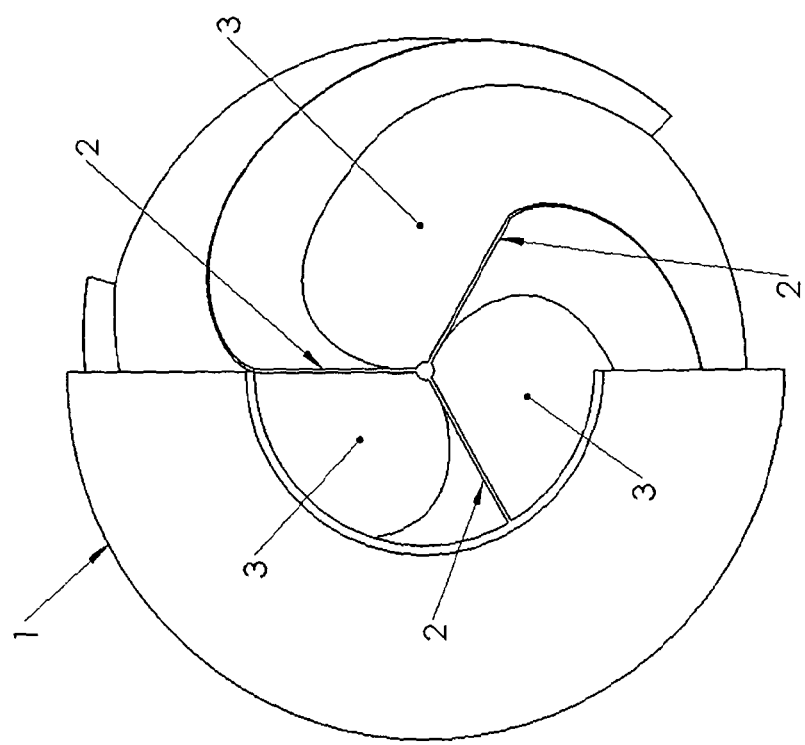
FIGS. 5A and 5B show a further alternative where the inner conic helix radius increases at a greater rate than the outer conic helix radius.
Figure 5A:
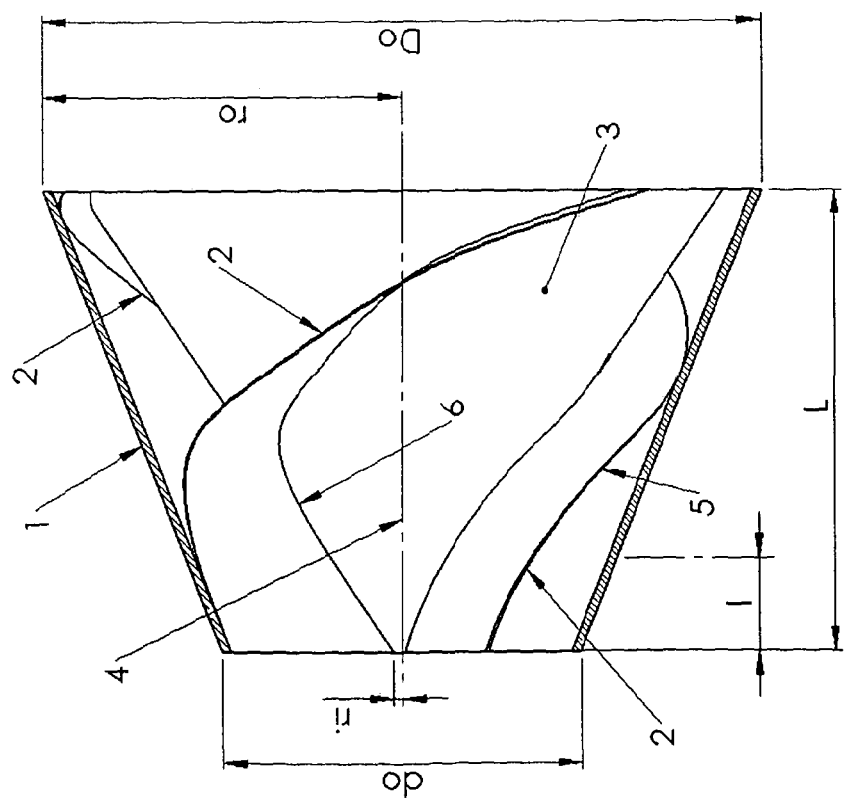

FIGS. 5A and 5B show a further variation in which the radius ri of the inner conic helix 6 increases at a greater rate than the radius ro of the outer conic helix 5 to thereby form a pair of non-parallel conic helixes that are spaced closer together at the large diameter end of the rotor than at the small diameter end of the rotor.

Figure 6B:
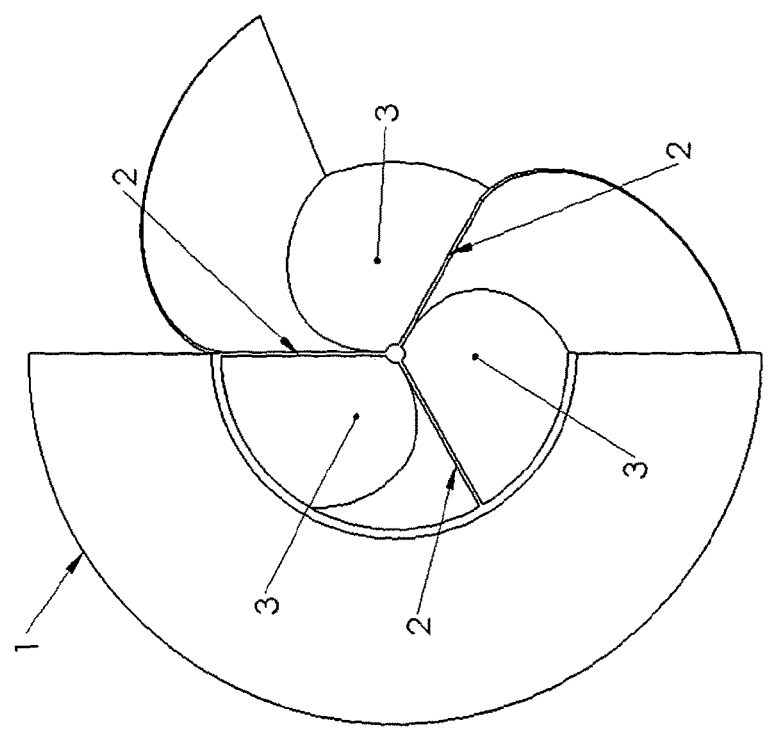
FIGS. 6A and 6B show an alternative embodiment where the helical pitch is decreased at a lesser rate than the rotor of FIGS. 1 and 2, FIGS. 7A and 7B show an alternative embodiment where the helical pitch is decreased at a greater rate than the rotor of FIGS. 1 and 2, FIGS. 8A and 8B illustrate an embodiment of a two-stage rotor apparatus arrangement in side view and end view with the outer rim partially omitted.
Figure 6A:
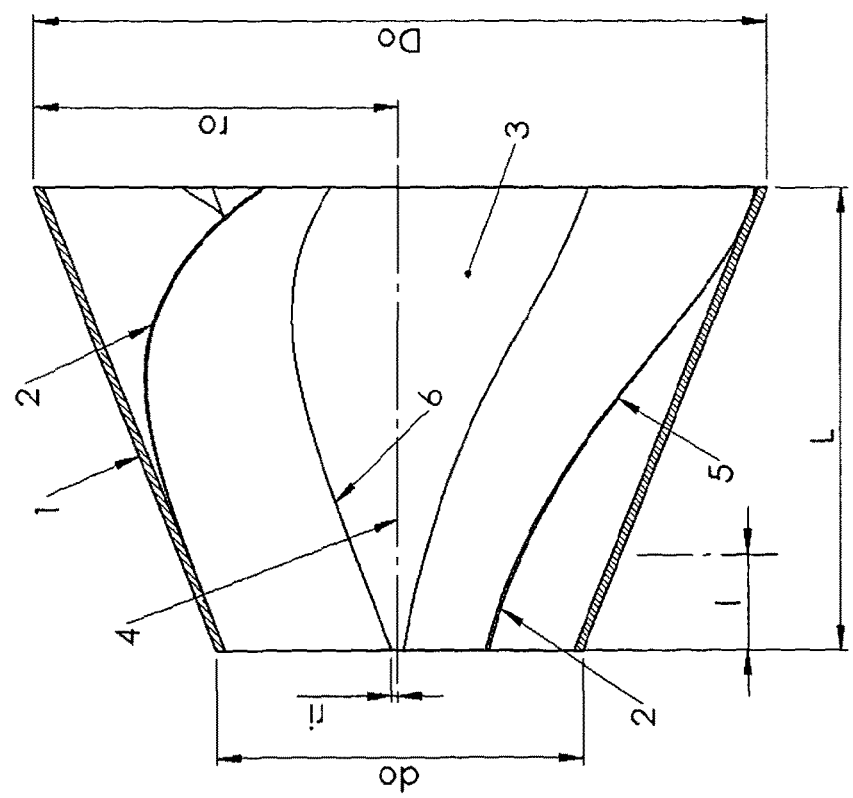
Figure 7B:
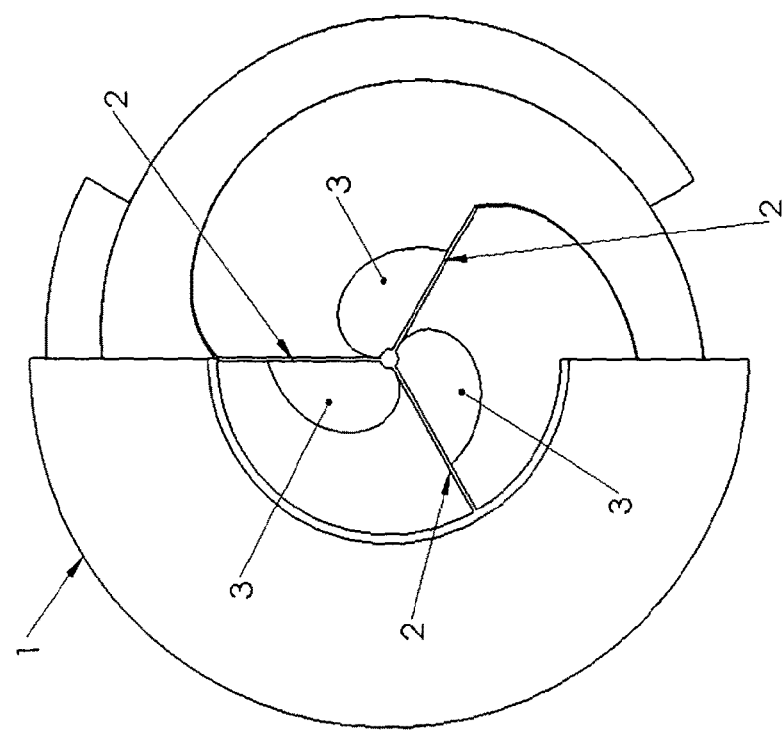
Figure 7A:
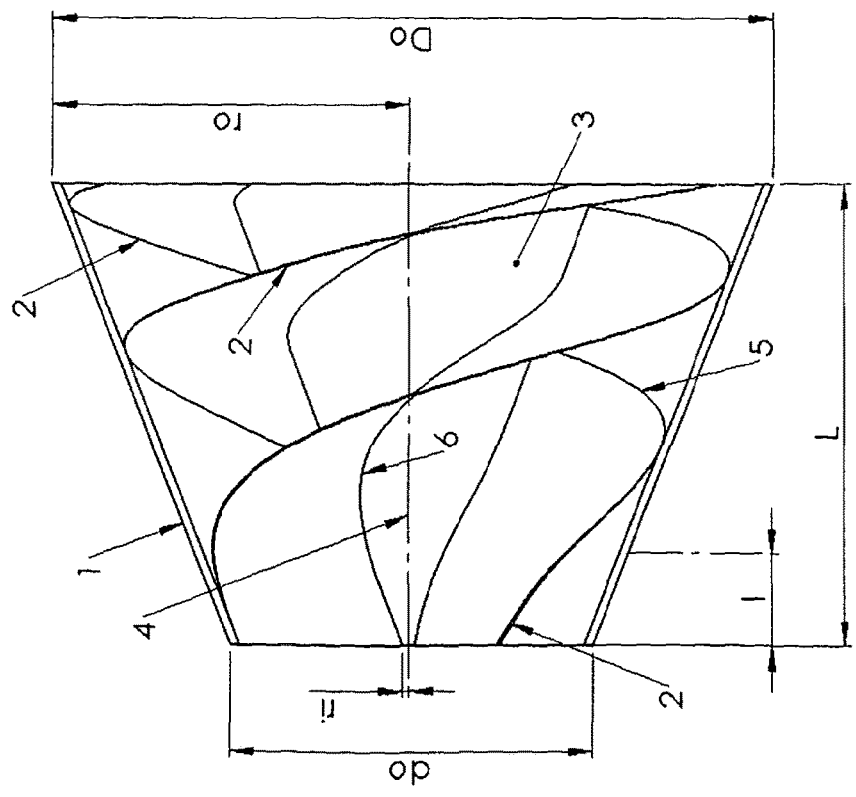

FIGS. 6A and 6B show a further variation which has parallel inner and outer cones as in FIGS. 1 and 2, but in which the helical pitch decreases at a slower rate than the previously described embodiments. This results in a slower rate of increase of the helical frequency. FIGS. 7A and 7B show the opposite variant in which the helical pitch decreases at a greater rate resulting in a faster rate of increase of the helical frequency.

Figure 8B:
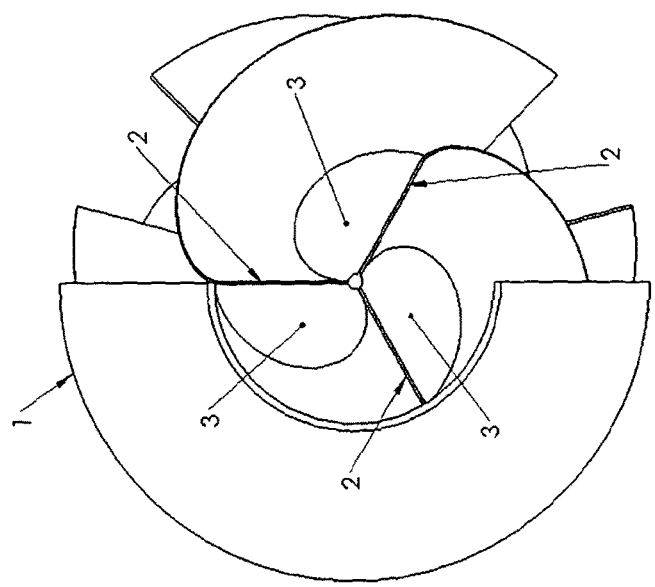
Figure 8A:
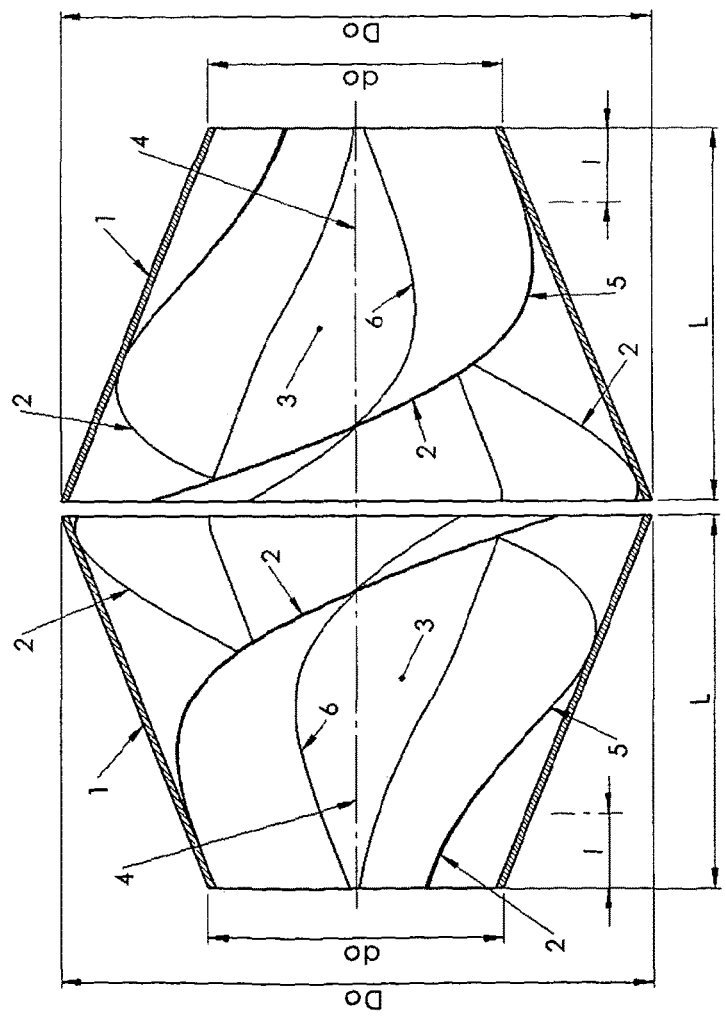
Figure 9A:
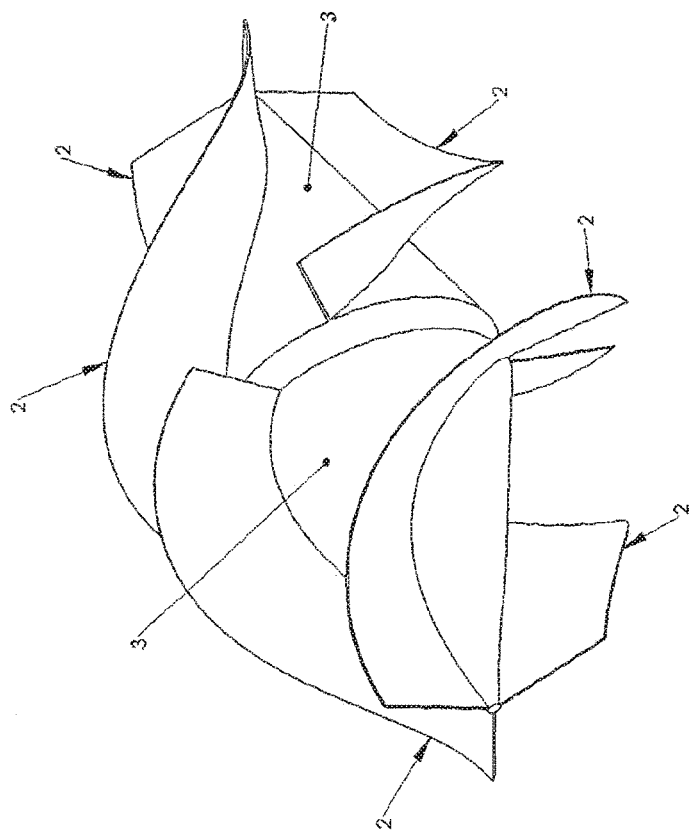
FIGS. 9A and 9B are perspective views of the two-stage rotor apparatus of FIG. 8 with the outer rim partially and fully omitted.
Figure 9B:
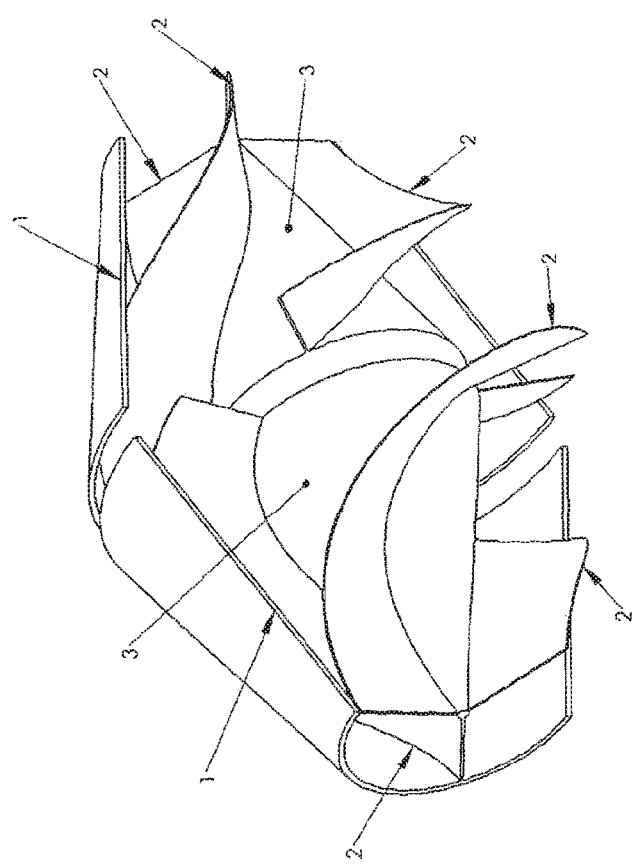

FIGS. 8A, 8B, 9A and 9B show a pair of rotors in a two-stage rotor apparatus that may function as a tidal turbine. FIGS. 8A and 8B are side and end views with the outer rim 1 partially omitted. FIGS. 9A and 9B are perspective views of the same rotor pair with the outer rim 1 partially and fully omitted. As can be seen from FIG. 8A, the two rotors are mounted end to end on a common axis of rotation 4. In use, the rotors with counter-rotate as described above. The rotors shown in the Figures are similar to the rotors illustrated in FIGS. 1, 2 and 3 herein, but it will be appreciated that the two-stage rotor apparatus could comprise any pair of rotors with the helical blade shape, such as any of the alternative embodiments and variations of rotors described herein.

Figure 10:
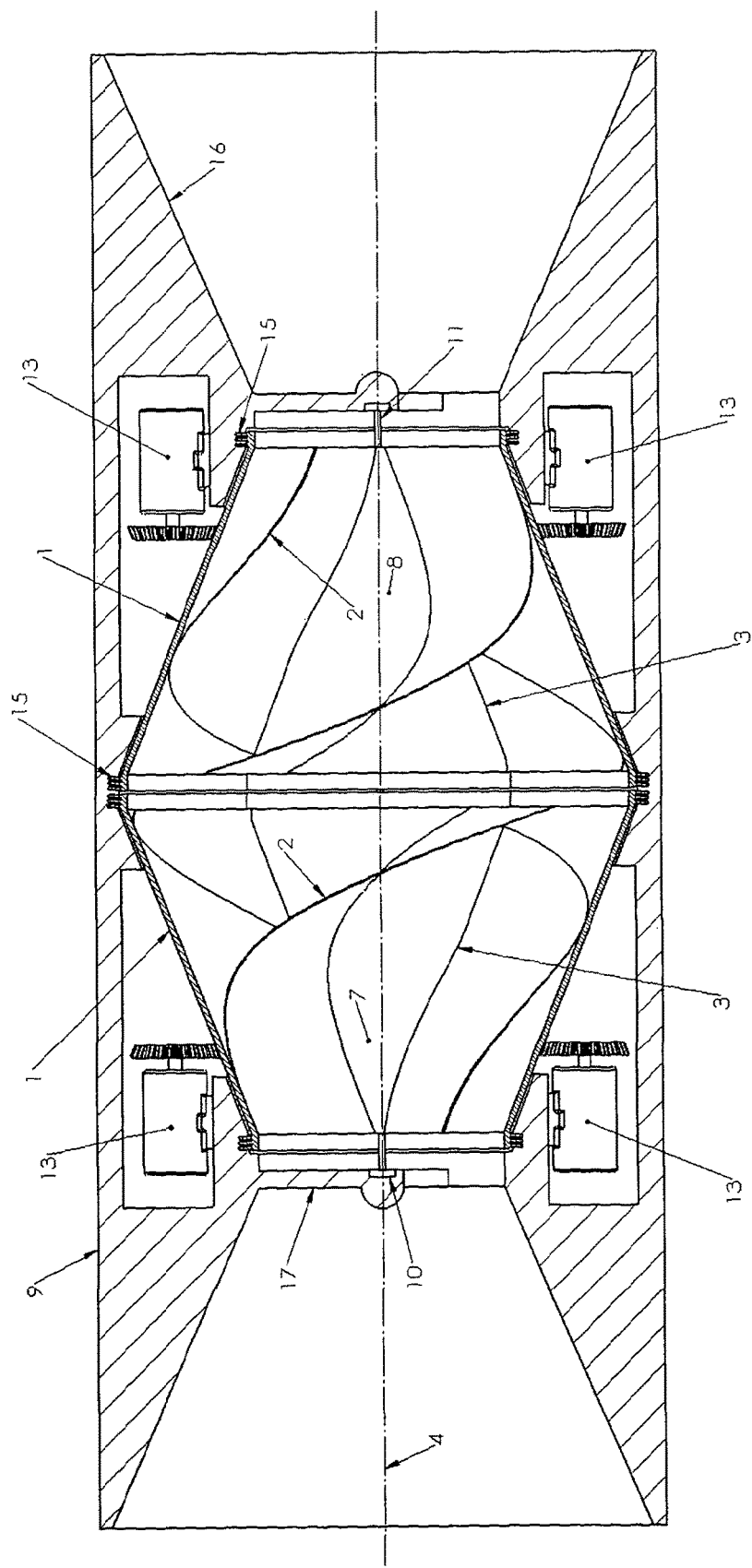
FIG. 10 shows a two-stage rotor apparatus installed in a housing with generators on the outer rotor surface.

FIG. 10 shows an embodiment of a two-stage rotor apparatus that may function as a tidal turbine with a pair of counter-rotating rotors 7, 8 installed in a housing 9 along a common longitudinal axis 4. The housing 9 is shown in cross-section and the rotors 7, 8 are shown in partial cross-section. The rotors 7 and 8 rotate about a common fixed shaft 11 that is secured to the housing 9 and supported by bearings 10. To ensure that the flow passes only through the rotors 7, 8, labyrinth seals 15 are placed at either end of the rotors 7, 8 between an inner surface of the housing 9 and outer surface of the rims 1 of each rotor 7, 8. In this embodiment, the two ends of the housing 9 have a convergent/divergent geometry 16 designed to increase/decrease the fluid velocity and enhance the performance of the two-stage rotor apparatus.

The two-stage rotor apparatus is used to accommodate a unidirectional flow and also a reversible or cyclic flow by the combination of two of the rotors. The first stage rotor receives the approaching liquid fluid flow possessing a longitudinal component and extracts a proportion of the kinetic energy by converting it into rotational force or torque that causes the first stage rotor to rotate. The second stage rotor has a geometry constructed in the same way as the first stage rotor and rotates around the same longitudinal axis as the first stage rotor but it is turned through 180° relative to the first stage rotor. It therefore rotates in the opposite direction about the axis. The liquid flow exits the first stage rotor at an angle determined by the helical pitch at the rotor outlet and is then received by the second stage rotor, the inlet to the second stage rotor being at a similar angle and helical pitch. At this stage the fluid possesses both a longitudinal and radial component. The second stage rotor extracts a further proportion of the kinetic energy from the liquid flow. When the fluid exits the second stage rotor it may possess a longitudinal component only and may be returned to the main flow with a low amount of interference.

In the embodiment of FIG. 10, the housing 9 is designed to provide a mounting area for multiple low torque, high speed, high efficiency generators 13 placed outside of the rotors 7, 8. The generators 13 are driven by the movement of the external rotating rim 1 of the rotors 7, 8 by appropriate gearing.

Figure 11:
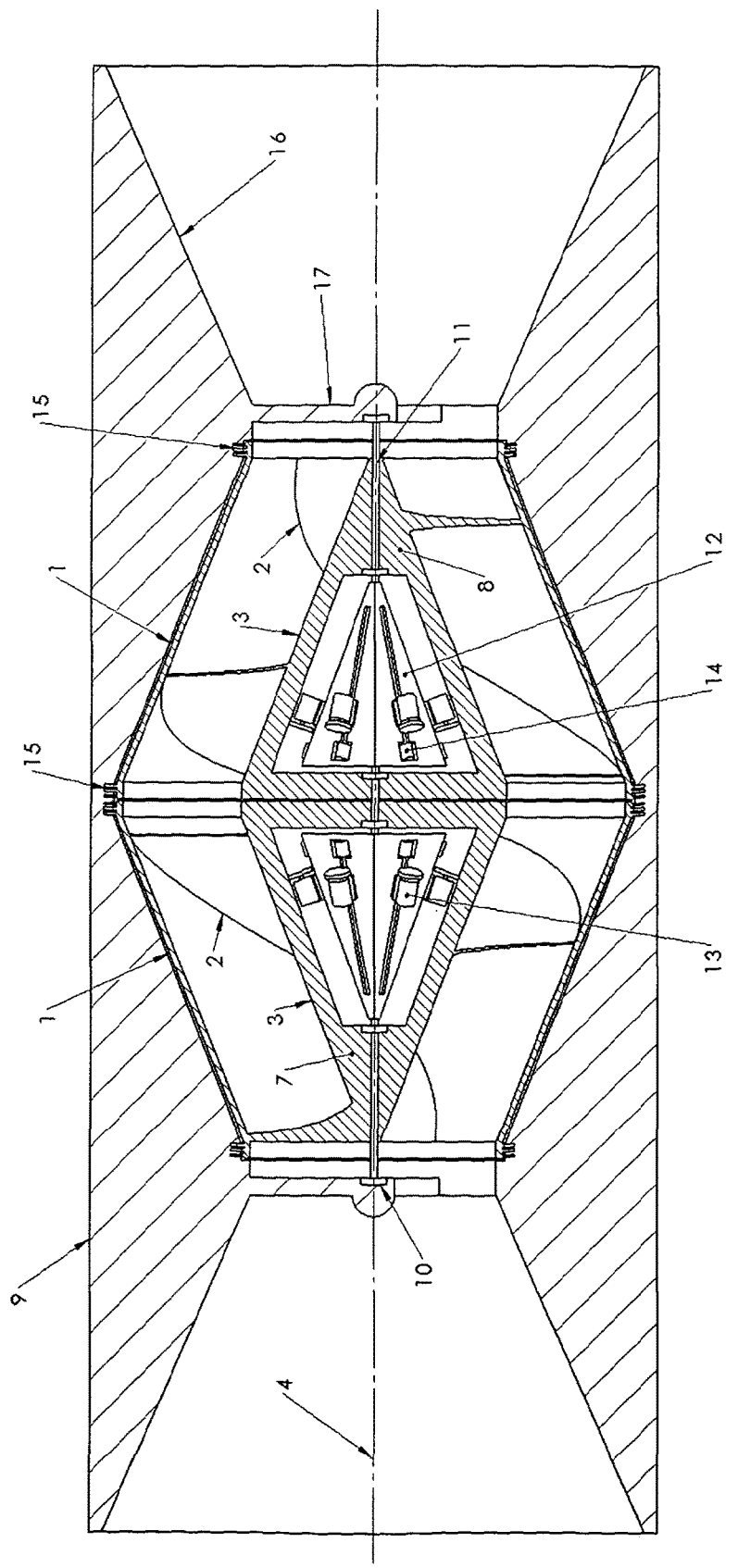
FIG. 11 shows a two-stage rotor apparatus installed in a housing with generators on an inner conical rotor surface.

FIG. 11 shows a cross-section of an alternative embodiment of a two-stage rotor apparatus installed in a housing 9. In the embodiment shown in FIG. 11, in contrast to the FIG. 10 arrangement the generators 13 are placed within the inner cone instead of outside the outer cone. Fixed mounting blocks 12 are attached to the fixed shaft 11 within the rotors 7 and 8. These provide a mounting area for multiple low torque, high speed, high efficiency generators 13. The generators 13 are driven by the internal surface of the inner cone 3 of the rotors 7, 8 by appropriate gearing.

As mentioned, in the present embodiment where the underlying spiral is based upon an Archimedean spiral where there is a linear increase in radius r with the polar coordinate θ, the rotor itself forms the shape similar to the frustum of a cone. A feature of this shape is that the linear velocity of the rim 3 varies along the longitudinal axis 4 due to a varying outer radius. Since the generators 13 in this embodiment are mounted on a block 12 with a surface parallel to the inner surface of the inner cone 3 the generators 13 can be moved along the surface by appropriate frame and stepper motors 14. The generators 13 can be secured to a common movable frame assembly or be separately moved along the frustum surface by stepper motors triggered by hard wired or wireless monitoring equipment and/or CPU so that the two-stage rotor apparatus is able to respond to changes in the rotational speed of the rotors 7, 8 and adjust the longitudinal position of the generators along the frustum. This allows the generators 13 to be moved within the rotors 7, 8 to respond to changes in the rotational speed of the rotors 7, 8. In this way, a relatively constant generator speed within the variable range of the generators 13 can be achieved through a range of fluid flows. For a low speed fluid flow the generator connection point can be made at the higher linear velocity end, this being at the larger diameter end of the rotor. For higher speed fluid flows the generator connection point can be repositioned at the lower linear velocity end, this being the smaller diameter end of the rotor. This presents a significant advantage, since, a complicated gearbox is not required representing a significant saving in expense and complexity.

Figure 12:
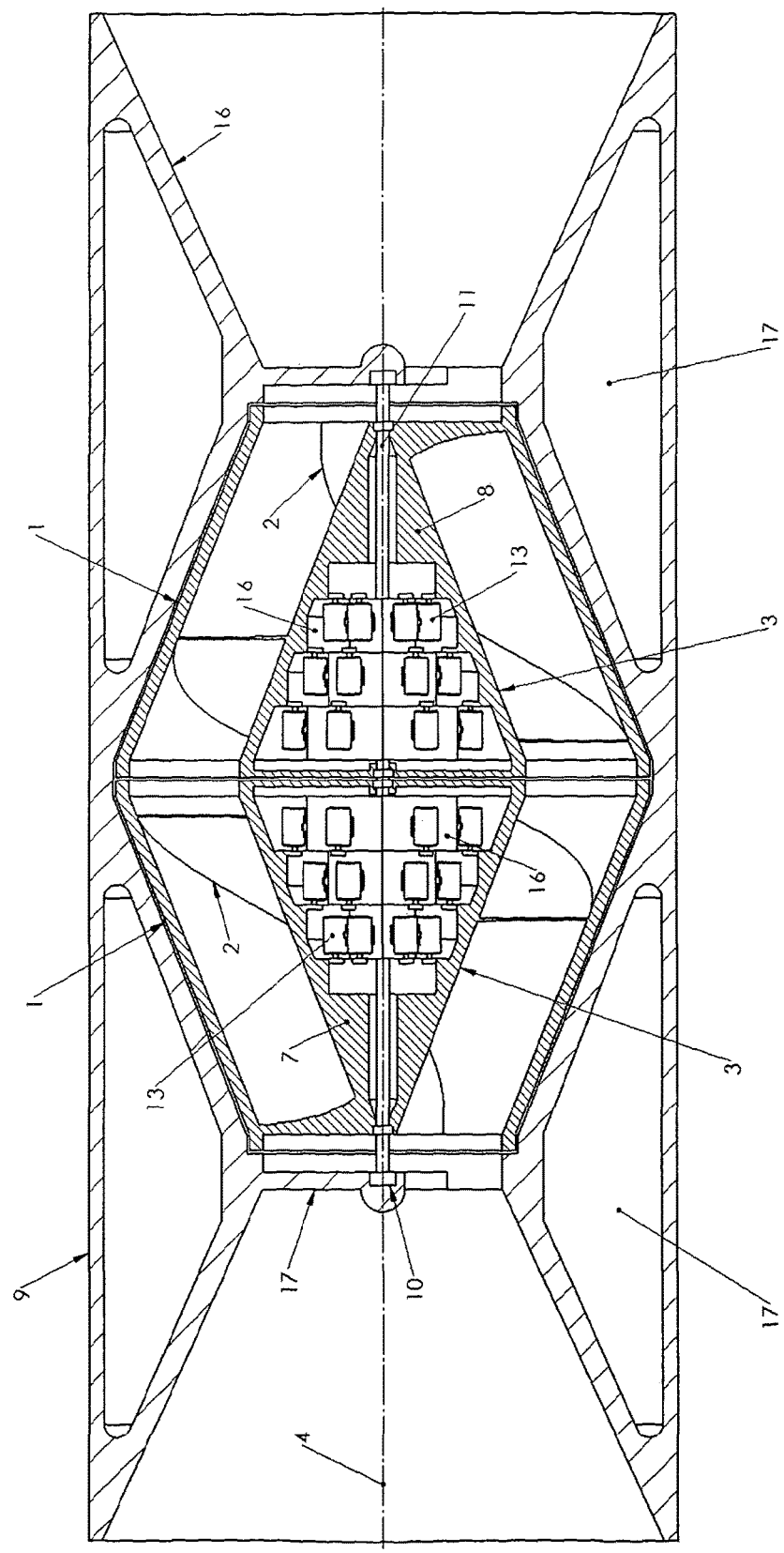
FIG. 12 shows an alternative arrangement with generators on a stepped inner rotor surface.

FIG. 12 shows a cross-section of an alternative embodiment of a two-stage rotor apparatus installed in a housing 9. In the embodiment shown in FIG. 12, in contrast to the FIG. 10 arrangement the generators 13 are mounted on a fixed motor mount 16 instead of outside the outer cone. The fixed motor mounts 12 are attached to the fixed shaft 11 within the rotors 7 and 8. This provides a mounting area for multiple low torque, high speed, high efficiency generators 13. The generators 13 are driven by the internal revolving surface of the inner cone 3 of the rotors 7, 8 by appropriate gearing.

As mentioned, in the present embodiment where the underlying spiral is based upon an Archimedean spiral where there is a linear increase in radius r with the polar coordinate θ, the rotor itself forms the shape similar to the frustum of a cone. A feature of this shape is that the linear velocity of the rim 3 varies along the longitudinal axis 4 due to a varying outer radius. Since the generators 13 in this embodiment are mounted on a fixed motor mount 16 the generators 13 can be installed as rings of generators that can be engaged or disengaged at different locations along the longitudinal axis 4. The rings of generators 13 can be engaged or disengaged by stepper motors triggered by hard wired or wireless monitoring equipment and/or CPU so that the two-stage rotor apparatus is able to respond to changes in the rotational speed of the rotors 7, 8 and adjust the number of rings of generators 13 in use at any given time.

This allows the rings of generators 13 to be selectively engaged and disengaged within the rotors 7, 8 to respond to changes in the rotational speed of the rotors 7, 8. In this way, a relatively constant generator output within the variable range of the rings of generators 13 can be achieved through a range of fluid flows. In addition, the operation of the rings of generators 13 outside of their operating range can be controlled and of course, all generators can be disconnected should the two-stage turbine become overloaded in freak fluid flows.

In general, for a low speed fluid flow rings of generators 13 can be engaged at the higher linear velocity end, this being at the larger diameter end of the rotor. For higher speed fluid flows the rings of generators can be engaged at the lower linear velocity end, this being the smaller diameter end of the rotor. The engagement of multiple rings is also possible, for example, engaging two or more rings of generators at the lower linear velocity end or two or more rings of generators at the higher linear velocity end. This presents a significant advantage over FIG. 11, since, a complicated positioning device is not required representing a significant saving in expense and complexity. Also shown in FIG. 12 are sealed compartments 17 which may incorporate control gear for the generators or buoyancy devices to allow for safe recovery of the two stage turbine to the surface for repair and service.

The two stage rotor apparatus may be effectively applied to horizontal as well as to vertical liquid fluid flow directions and to those in-between by varying the orientation of the inlet and outlet and the orientation of the rotors. In tidal turbine applications, the rotor housing also functions to direct the liquid flow into the rotor to correct minor cross-flow deviations. For larger cross-flow deviations, the rotor housing may have a steering and suspension system and include fins, gearing and buoyancy control devices in order for it to adjust its position within a flow field in order to optimise performance or to surface for maintenance purposes if submerged in a liquid stream. The steering and suspension system provides a certain self-adjusting capability with regards to changes in flow direction.

It is possible to have further two-stage rotor apparatus arranged or installed in series in the rotor housing. However, the amount of power remaining in the liquid flow exiting the first two-stage turbine would be less than that contained in the original liquid flow. Therefore, it appears more economical to have multiple two-stage rotor apparatus in parallel.

In operation, particularly in tidal turbine applications, the two-stage rotor apparatus may be supported on a floor, e.g. the seabed or it may be suspended in a liquid flow by means of a tethering or anchoring arrangement to the seabed or a floating raft. Or it may sit on a tower installed on the seabed so that it can be recovered from the sea for maintenance by a ship on the surface or by a telescopic extending arrangement in the tower. Or it may be configured as being neutrally buoyant so that it sits suspended in the fluid flow, by modifying the buoyancy of the unit, the two stage turbine arrangement may be raised to the surface or lowered to the seabed. Or the entire turbine arrangement may be configured so that only a smaller part of the arrangement would need to be recovered for maintenance. In this case a sub unit of the arrangement containing the rotor and electrical components only could be separated from the main installed structure leaving the main installed structure in place. This provides a simpler maintenance operation.

Figure 13:
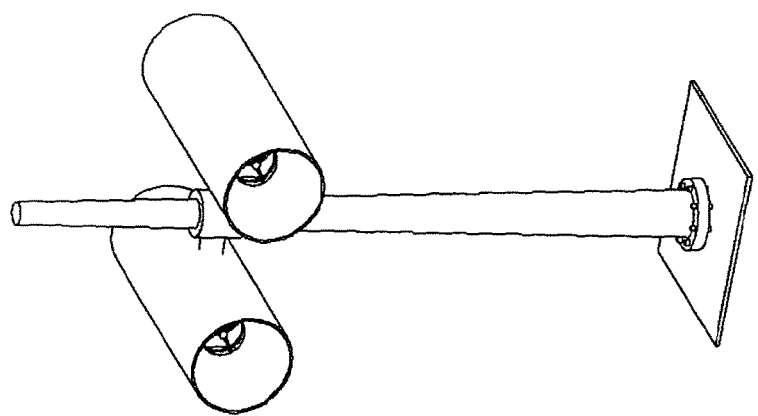
FIG. 13 illustrates an arrangement with a pair of two-stage rotor apparatus installed on a tower type of structure for use on the sea bed.

FIG. 13 shows one possible utilisation of the two-stage rotor apparatus as a tidal turbine. Rotors 7,8 in two housings 9 as shown in FIG. 10, 11 or 12 are installed on a tower structure that can be installed on the sea bed. The multiple rotor housings may be aligned with the primary flow direction to allow effective operation in a reversible or cyclic flow such as a tidal current system. Since the two-stage rotor apparatus is capable of efficient operation with flow in either direction it is not necessary to provide a mechanism for rotation of the tower when the tidal flow changes direction.

An alternative arrangement (not shown) would be to mount the two-stage rotor apparatus in a housing within a pipe where fluid flows. Fluid flow in either direction would be efficiently converted into rotational movement and, in accordance with one embodiment of the rotor, converted into electrical power by generators. The pipe could be installed within the waterways of a dam or a hydropower station or a tidal barrage. Alternatively, if may be within an enclosed liquid current system consisting of two liquid reservoirs connected in such a way that the transfer of liquid from one reservoir to the other is allowed. A liquid flow may be induced between the two reservoirs as a consequence of externally applied natural or man-made forces. Such an external force may be experienced if installed transversely or longitudinally on board a ship or some other moving object such as a train or automobile creating transverse and/or longitudinal motion.

Thus, rotors as described herein are utilised in embodiments in a two-stage rotor apparatus installed in a rotor housing. When the two-stage rotor apparatus is subjected to a variety of liquid fluid flow scenarios, such as tidal flows, the rotors extract the kinetic energy from the liquid fluid flow and convert it into a rotational force or torque which causes the pair of specially shaped rotors to rotate.

In one tidal flow embodiment the torque is applied to drive electrical generators as set out above. Alternatively, the torque may be used to drive a pump, a compressor or any other device requiring a rotational force or torque to be applied.

The geometry of the rotors facilitates the conversion of the kinetic energy in the liquid fluid flow to rotational force or torque. The geometry of the rotors is based on pair of conic helixes 5, 6 that have an increase in radius r with a polar coordinate θ along the longitudinal axis 4, each helix 5, 6 possessing a different initial radius. The pair of conic helixes 5, 6 also have a pitch that decreases with the polar coordinate θ as the radius increases. The decreasing helical pitch provides an increasing helical frequency. This type of conic helix may be defined as a three dimensional spiral having varying radius r as a function of the polar coordinate θ but also having a third variable, the length l, varying also as function of the polar coordinate θ.

The pair of conic helixes may be generated in a clockwise or anticlockwise direction and as shown in FIGS. 6A to 7B the rate of decrease of the helical pitch resulting in an increase in helical frequency may be varied to obtain decrease of helical pitch per unit of length, which, in one implementation, may be an optimum decrease of helical pitch unit of length. Other variables that have a direct effect on the power extracted are the initial and final radii of the pair of conic helixes (and thus the minimum and maximum inner and outer diameters of the rotor) and the overall length of the rotor. These may also be optimised for a given flow situation. For example, in a pipeline application, space may be limited and restricted to existing pipeline diameters, therefore a rotor having a relatively small minimum and maximum outer diameters may be used, for example 1 m and 2 m diameter respectively. In this case, a longer rotor may be beneficial which then allows room to extend the pair of conic helixes to optimise the power output. In a tidal turbine application, space may not be an issue and large diameters, for example 10 m and 20 m respectively can be utilised to greatly enhance the power output. A shorter rotor can then be used to reduce installation and footprint costs.

The rotor blade surfaces of the rotor are formed when the pair of conic helixes are connected together in the radial direction. In the rotors shown in the Figures three identical rotor blades 2 are present. There could alternatively be less or more identical rotor blades 2 spaced equally around the rotor. The rotor blades 2 extend between the inner peripheral surface 3 and the outer rim 1 and are fixed to either the inner peripheral surface 3 or the outer rim 1 for rotation therewith.

A hydrodynamic reaction force is created on a solid surface when a body of fluid flowing over the solid surface experiences a change of momentum. The net hydrodynamic force acting on the body of fluid in a particular direction is equal to the rate of change of momentum of the body of fluid in that direction as dictated by Newton's Second law. In accordance with Newton's Third Law, an equal and opposite hydrodynamic reaction force acts on the solid surface bounding the body of fluid. Examples of such hydrodynamic reaction forces are those found when a jet of water strikes a wall, or the force felt in a pipe system when the fluid is forced to turn a bend or the force felt on a solid body when placed in a flowing fluid forcing the fluid to flow around it.

In the rotors described herein a solid surface bounding the body of flowing fluid is formed by the front and rear of a pair of rotor blades and the inner and outer rims of the rotor. As the body of fluid flows through the specially shaped rotor and its complicated flow passages it is constantly forced to change direction due to the shape of the blades and the decreasing helical pitch from inlet to outlet which results in an increasing helical frequency, thereby resulting in a continuous rate of change of momentum. This rate of change of momentum necessarily results in a hydrodynamic reaction force that acts on the solid surfaces of the rotor. As the conic helix has a given geometrical direction, this being clockwise or anticlockwise, the hydrodynamic reaction force acts in the opposite direction and since the centre of the hydrodynamic reaction force is displaced at a radial distance from the longitudinal axis, a torsional force is generated that acts around the longitudinal axis of the rotor and tends to turn the rotor.

The underlying mathematical spiral of the conic helix can be based on Archimedean, Euler, Fibonacci, Hyperbolic, Lituus, Logarithmic, Theodorus or any other known spiral having varying radius r as a function of the polar coordinate θ but also having a third variable, the length l, varying also as function of the polar coordinate θ. For the reasons discussed above, it is apparent that an underlying spiral possessing a more rapid change in inner and outer radius r with the polar coordinate θ would induce a more rapid rate of change of momentum necessarily resulting in an increased hydrodynamic reaction force. This is akin to comparing a shallow bend with a sharp bend. It is well known that the force felt in a pipe system is increased when the fluid is forced to turn the sharper of the two bends.

In the embodiments described above, for reasons of simplicity, the underlying spiral is based upon an Archimedean spiral when there is a linear increase in radius r with the polar coordinate θ. However, it is equally feasible to construct the rotor by way of a non-linear increase in inner and outer radii r with the polar coordinate θ through the use of a different underlying mathematical spiral such as Archimedean, Euler, Fibonacci, Hyperbolic, Lituus, Logarithmic, Theodorus or any other known spiral having varying radius r as a function of the polar coordinate θ but also having a third variable, the length l, varying also as function of the polar coordinate θ. The use of a Archimedean spiral with linear increase in the radii r with the polar coordinate θ provides a conic helix formed about a straight sided frusto-cone as shown in the Figures. Conversely, a non-linear increase in the inner and outer radii r with the polar coordinate θ would provide a different shape, for example the external and internal conic surfaces may be curved.

In some embodiments illustrated herein, the pair of conic helixes are chosen to have a linear increase in radii r with the polar coordinate θ along the longitudinal axis, each possessing a different initial radius. In some embodiments, as in FIGS. 4A to 5B the increasing radius of either conic helix may increase at greater or lesser rates to form a pair of non-parallel conic helixes. In other embodiments, as in FIGS. 1A to 3B they may increase at the same rate to form a pair of parallel conic helixes. Simultaneously, the helical pitch is also decreased by way of varying l as a function of θ continuously or in discrete steps along the longitudinal axis 4. The rate of decrease of helical pitch or the rate of increase of helical frequency in the embodiments of the Figures is linear. It may alternatively be non-linear.

The helix shape, radius increase and pitch decrease combine to provide the overall hydrodynamic reaction force on the rotor and thus the torque and power output. These parameters may be configured to increase the power extraction from a given fluid flow, wherein in one implementation, the power extraction may be a maximum power extraction, or to limit the power extraction from a given fluid flow. The following set of equations consider the hydrodynamic reaction forces and torques generated.

$$\dot{m}_{in}=\dot{m}_{out}=\dot{m} \qquad [1]$$

$$F_x=\dot{m}(u_z-u_z) \qquad [2.1]$$

$$F_y=\dot{m}(v_z-v_z) \qquad [2.2]$$

$$F_z=\dot{m}(w_z-w_z) \qquad [2.3]$$

$$T_x=F_z\times y-F_y\times z \qquad [3.1]$$

$$T_y=F_x\times z-F_z\times x \qquad [3.2]$$

$$T_z=F_y\times x-F_x\times y \qquad [3.3]$$

As stated in Equation [1], the mass flow $\dot{m}$ into the rotor is constant. The hydrodynamic reaction forces $F_x$, $F_y$ and $F_z$ are necessarily produced due to the continuously decreasing helical pitch or in other words, due to a continuous change in the direction of the fluid flow and thus a change in the velocity components u, v and w of the fluid between the velocity components at first and second arbitrary cross sections in the rotor, the first and second arbitrary cross sections being at different distances along the rotor length. This results in a rate of change of momentum and the hydrodynamic reaction forces as expressed by Equation [2.1] to [2.3]. Observing the right hand rule, the torques $T_x$, $T_y$ and $T_z$ around the x, y and z axis of the rotor are produced by the out of balance cross product of the hydrodynamic force components and the relevant distances x, y and z from the longitudinal axis about which they act as shown by Equations [3.1] to [3.3].

According to this set of equations it can be understood that a change in the rate of decrease of the helical pitch will result in an increase or decrease in the torsional forces and power output. A decrease in torsional force is achieved by a slower rate of decrease of helical pitch and an increase in torsional force is achieved by a faster rate of decrease of helical pitch.

The distance from the longitudinal axis at which the hydrodynamic reaction forces act is continuously increased or decreased by the change in radius of the pair of conic helixes. For each complicated flow passage a separate set of torsional forces result, the total torsional force around the longitudinal axis of the rotor being the sum of all torsional forces acting around the longitudinal axis of the rotor.

In the case where the increasing radii of the pair of conic helixes increase at the same rate to form a pair of parallel conic helixes this results in an equal increase in the distance from the longitudinal axis at which the hydrodynamic reaction forces act and thus a magnification of the torsional force and power output as determined by Equation [3.1] to [3.3]. In this case, the cross sectional areas at first and second arbitrary cross sections in the rotor increase at a constant rate and since the mass flow is constant, the velocity differences and thus hydrodynamic reaction forces produced are constant. The magnification of the torsional force and power output is only dependent on the rate at which the radius of the pair of conic helixes increases.

Where the radius of the pair of conic helixes increase at greater or lesser rates to form a pair of non-parallel conic helixes, this has the effect of changing the rate at which the cross sectional areas at first and second arbitrary cross sections in the rotor increase. When the inner conic helix increases in radius at a slower rate than the increase in radius of the outer conic helix, the arbitrary cross sectional areas increase at a faster rate. This has the effect of reducing the changes in the velocity components and since the mass flow is constant, the hydrodynamic reaction forces produced are lower. When the inner conic helix radius increases at a faster rate than the outer conic helix radius, the arbitrary cross sectional areas increase at a slower rate. This has the effect of increasing the changes in the velocity components and since the mass flow is constant, the hydrodynamic reaction forces produced are larger. Thus, through manipulation of the parameters of the rotor, it is possible to manipulate the extracted power output and optimise or restrict it.

In addition, the connection between the pair of conic helixes is not limited to being straight. The connection may be curved, for example, a concave surface may be used to increase the surface area along the surface of the specially shaped rotor blade in order to spread the resulting hydrodynamic forces over a larger area and reduce internal stresses. Similarly, the pair of conic helixes are generally axially aligned for simplicity but may be slightly misaligned in order to change the surface characteristics of the conic helixes in a beneficial way.

Figure 14:
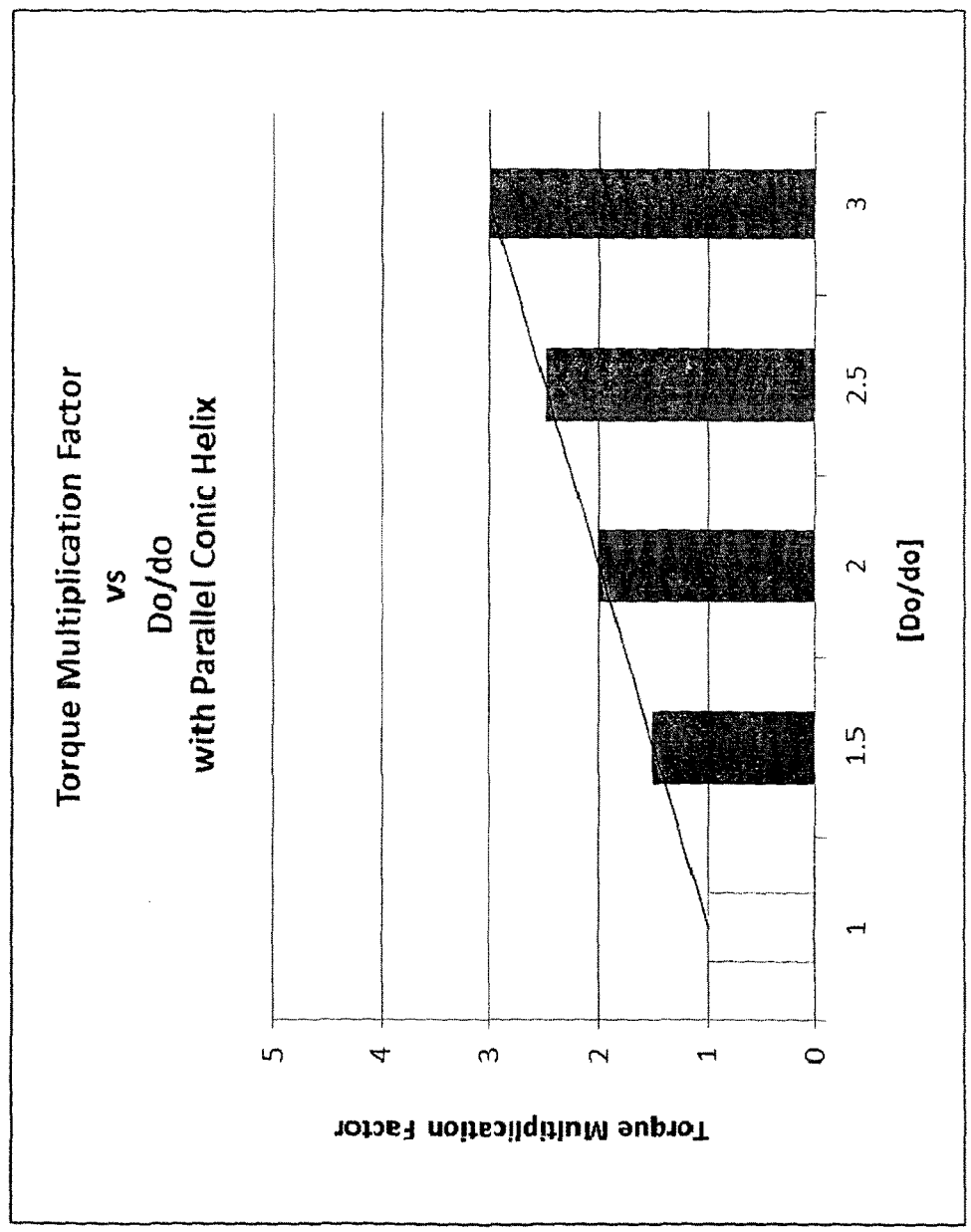
FIG. 14 is a graph showing the variation in torsional forces generated by a two stage rotor apparatus as the ratio of the minimum radius do and maximum radius Do of the conic helix is changed.
Figure 15:
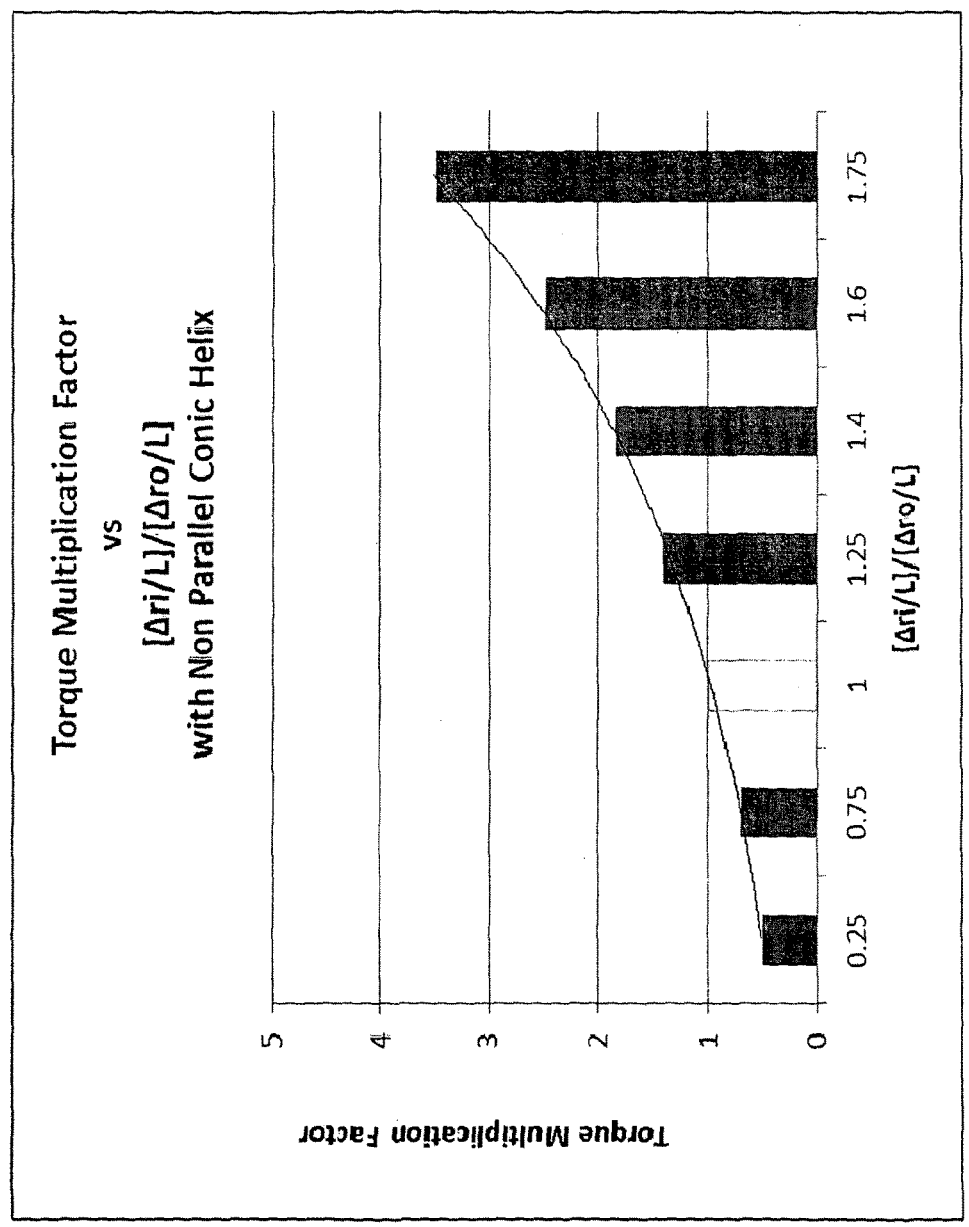
FIG. 15 is a graph showing the variation in torsional forces generated by a two stage rotor apparatus with modification to the rate at which the inner conic helix radius increases compared to the outer conic helix radius.
Figure 16:
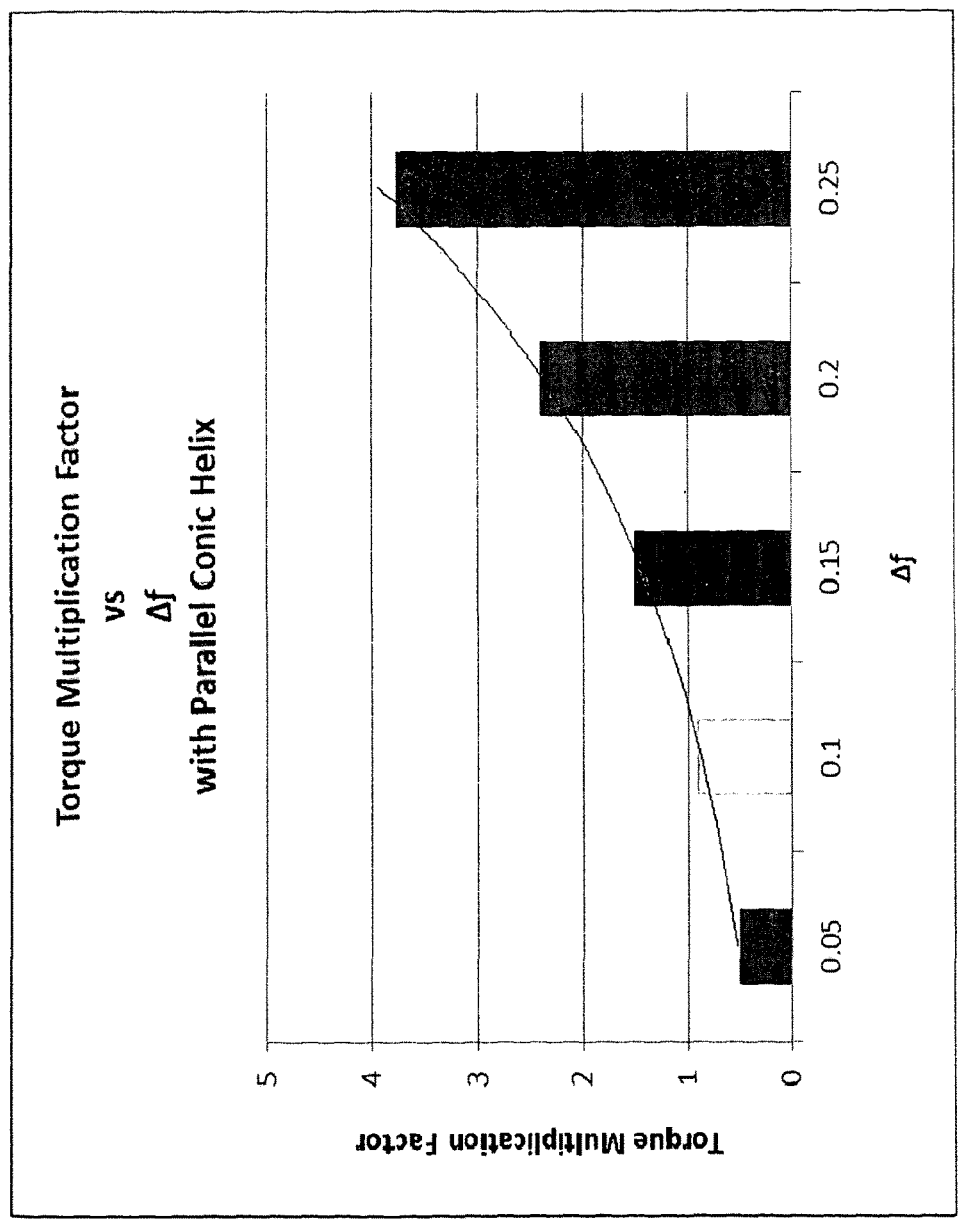
FIG. 16 is a graph showing the variation in torsional forces generated by a two stage rotor apparatus when the rate of decrease of the helical pitch is adjusted by altering the rate of increase of helical frequency.

As discussed above, various parameters of the rotor and blade shape can be varied depending on the purpose of the rotor and the operating conditions that it will be exposed to, such as flow rate and so on. FIGS. 14 to 16 illustrate how changes to these parameters affect the performance of the rotor.

FIG. 14 is a graph illustrating the effect of varying the ratio of the outer maximum diameter Do of the rotor to the minimum outer diameter do. In this case, the radii of the pair of conic helixes are increased at the same rate to form a pair of parallel conic helixes. The increasing diameter results in an increase in the distance from the longitudinal axis at which the hydrodynamic reaction forces act and thus provides a magnification of the torsional force. The magnification of the torsional force is dependent on the rate at which the radii of the pair of conic helixes increase.

As a baseline, FIG. 14 uses an arrangement with no change in diameter, i.e. where the ratio of maximum and minimum radii [Do/do] is one. This is a rotor where the radii of the pair of conic helixes does not increase i.e. this is a rotor based upon a cylindrical helix and not a conic helix. The rotors described herein, which are based on blades formed by conic helixes, have a ratio of greater than one and this provides a torque multiplication and an increase in efficiency as shown in the Figure.

In some of the variants discussed above, the inner and outer conic helixes are formed on non-parallel conic surfaces. FIG. 15 is a graph illustrating the effect of increasing or decreasing the relative radii of the pair of conic helixes to form a pair of non-parallel conic helixes. When the inner conic helix increases in radius at a slower rate than the increase in radius of the outer conic helix (i.e. [$\Delta ri/L$]/[$\Delta ro/L$]<1), arbitrary cross sectional areas at first and second longitudinal distances along the rotor increase at a faster rate. This has the effect of reducing the changes in the velocity components and since the mass flow is constant, the hydrodynamic reaction forces and torsional forces produced are lower. When the inner conic helix radius increases at a faster rate than the outer conic helix radius (i.e. [$\Delta ri/L$]/[$\Delta ro/L$]>1), the arbitrary cross sectional areas within the rotor increase at a slower rate. This has the effect of increasing the changes in the velocity components and since the mass flow is constant, the hydrodynamic reaction forces and the torsional forces produced are larger. The point where [$\Delta ri/L$]/[$\Delta ro/L$]=1 is a rotor where the radii of the pair of conic helixes increase at the same rate to form a pair of parallel conic helixes.

Other variants discussed above involve the use of different changes in pitch for the decreasing pitch of the conic helixes. FIG. 16 is a graph illustrating the effect of changes in the rate of decrease of the helical pitch that results in a change in the rate of increase of helical frequency $\Delta f$. As shown in the Figure, a change of this nature will result in an increase or decrease in the torsional forces and thus power output. A decrease in torsional force is achieved by a slower rate of decrease of helical pitch or a slower rate of increase of helical frequency and an increase in torsional force is achieved by a faster rate of decrease of helical pitch or a faster rate of increase in helical frequency. In FIG. 16, the rotor labelled $\Delta f$=0.1 is based upon the rotor presented in FIGS. 1A to 3B. In comparison, the rotor labelled $\Delta f$=0.05 is based upon the rotor presented in FIGS. 6A and 6B whilst the rotor labelled $\Delta f$=0.25 is based upon the rotor presented in FIGS. 7A and 7B.

In summary, the embodiments described herein provide a compact low complexity two-stage rotor apparatus that is ideal for generation of electricity from tidal flow. The two-stage rotor apparatus can however be effectively applied to any liquid flow system which may have single, reversible or cyclic liquid current characteristics. The design of the rotors and blades can be tuned to a particular application through variation of parameters as described above. The parameters are not limited to the values and combinations of values set out herein. Instead the parameters can be varied alone or in combination to achieve desired performance characteristics. These features ensure that the two-stage rotor apparatus can operate efficiently under the significantly varying conditions and scenarios found in liquid fluid flows.

The invention claimed is:

1. A rotor apparatus for extracting energy from unidirectional or bidirectional fluid flows, the rotor apparatus comprising a first rotor mounted for rotation about an axis of rotation in a first direction of rotation, the first rotor having at least one helical blade with a pitch that decreases in a direction along the axis of rotation; and a second rotor mounted for rotation about the same axis of rotation in an opposite direction of rotation and having at least one helical blade with a pitch that increases in the same direction along the axis of rotation, wherein the fluid flows along the axis of rotation and the fluid exiting the first rotor is passed to the second rotor.

2. The rotor apparatus as claimed in claim 1, wherein the rotor apparatus is a rotor apparatus for extracting energy from tidal flows.

3. The rotor apparatus as claimed in claim 1, wherein the first or second rotor have an opening at the inlet or outlet end of the rotor apparatus that is arranged to receive or expel fluid flowing in a generally axial direction.

4. The rotor apparatus as claimed in claim 1, wherein the first and second rotors have openings at their opposed ends that are adapted to receive or expel fluid flowing with a radial component as well as an axial component.

5. The rotor apparatus as claimed in claim 1, wherein the first and second rotors have opposed ends that are of the same diameter.

6. The rotor apparatus as claimed in claim 1, wherein at least one helical blade of the first rotor or second rotor is a blade or blades formed by a surface extending between inner and outer conic helixes, the conic helixes each having a pitch that decreases as the radii of the helixes increases, and wherein the radius of the inner conic helix increases at a different rate than the radius of the outer conic helix such that the helixes are non-parallel.

7. The rotor apparatus as claimed in claim 6, wherein the two rotors have larger diameter ends opposing one another and being of the same diameter.

8. The rotor apparatus as claimed in claim 6, wherein the at least one helical blade of the first rotor and the second rotor have a blade or blades of the same shape formed by similar conic helixes.

9. The rotor apparatus as claimed in claim 1, comprising a housing about the first and second rotors, the housing being for supporting the rotors for rotation about the axis of rotation.

10. The rotor apparatus as claimed in claim 9, wherein the rotor housing has an inlet section and an outlet section, with the inlet geometry of the rotor housing being designed to increase the linear velocity of a liquid flow as it enters a rotor entrance and the outlet section of the rotor housing being designed to slow down a liquid flow in a controlled manner.

11. The rotor apparatus as claimed in claim 1, wherein a generator comprises the rotor apparatus.

12. The rotor apparatus as claimed in claim 1, wherein the rotor apparatus produces rotational kinetic energy from a flow of a fluid.

13. The rotor apparatus as claimed in claim 12, wherein the flow is a tidal flow.

14. A method of manufacturing a two-stage rotor apparatus comprising: mounting a first rotor for rotation about an axis of rotation, the first rotor having at least one helical blade with a pitch that decreases in a direction along the axis of rotation; and
mounting a second rotor for rotation about the same axis of rotation in an opposite direction of rotation, the second rotor having at least one helical blade with a pitch that increases in the same direction along the axis of rotation.

15. The method as claimed in claim 14, wherein the rotor apparatus is a rotor apparatus for extracting energy from tidal flows.

16. The method as claimed in claim 14, wherein the first or second rotor have an opening at the inlet or outlet end of the rotor apparatus that is arranged to receive or expel fluid flowing in a generally axial direction.

17. The method as claimed in claim 14, wherein the first and second rotors have openings at their opposed ends that are adapted to receive or expel fluid flowing with a radial component as well as an axial component.

18. The method as claimed in claim 14, wherein the first and second rotors have opposed ends that are of the same diameter.

19. The method as claimed in claim 14, wherein at least one helical blade of the first rotor or second rotor have a blade or blades formed by a surface extending between inner and outer conic helixes, the conic helixes each having a pitch that decreases as the radii of the helix helixes increases, and wherein the radius of the inner conic helix increases at a different rate than the radius of the outer conic helix such that the helixes are non-parallel.

20. The method as claimed in claim 19, wherein the two rotors have larger diameter ends opposing one another and being of the same diameter.

21. The method as claimed in claim 19, wherein the at least one helical blade of the first rotor and the second rotor have a blade or blades of the same shape formed by similar conic helixes.

22. The method as claimed in claim 14, further comprising: mounting a housing about the first and the second rotors, the housing being for supporting the rotors for rotation about the axis of rotation.

23. The method as claimed in claim 22, wherein the rotor housing has an inlet section and an outlet section, with the inlet geometry of the rotor housing being designed to increase the linear velocity of a liquid flow as it enters a rotor entrance and the outlet section of the rotor housing being designed to slow down a liquid flow in a controlled manner.

* * * * *